United States Patent
Lee et al.

(10) Patent No.: US 12,171,044 B2
(45) Date of Patent: Dec. 17, 2024

(54) METHOD AND DEVICE FOR ULTRA-WIDEBAND COMMUNICATION

(71) Applicant: Samsung Electronics Co., Ltd., Gyeonggi-do (KR)

(72) Inventors: Mingyu Lee, Gyeonggi-do (KR); Taeyoung Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/871,214

(22) Filed: Jul. 22, 2022

(65) Prior Publication Data
US 2023/0037601 A1 Feb. 9, 2023

(30) Foreign Application Priority Data

Jul. 22, 2021 (KR) .................. 10-2021-0096622
Jan. 7, 2022 (KR) .................. 10-2022-0002898

(51) Int. Cl.
*H04W 8/00* (2009.01)
*H04B 1/7163* (2011.01)
*H04W 76/14* (2018.01)

(52) U.S. Cl.
CPC .......... *H04W 8/005* (2013.01); *H04B 1/7163* (2013.01); *H04W 76/14* (2018.02)

(58) Field of Classification Search
CPC ..... H04W 8/005; H04W 76/14; H04B 1/7163
See application file for complete search history.

(56) References Cited

U.S. PATENT DOCUMENTS

| | | | |
|---|---|---|---|
| 9,769,686 B2 | 9/2017 | Kang et al. | |
| 10,375,710 B2 | 8/2019 | Choi et al. | |
| 10,681,591 B2 | 6/2020 | Lee et al. | |
| 2006/0120433 A1* | 6/2006 | Baker | H04B 1/7163 375/130 |
| 2008/0248768 A1* | 10/2008 | Doi | H04W 52/0245 455/127.5 |
| 2015/0133054 A1 | 5/2015 | Chen et al. | |
| 2021/0006652 A1 | 1/2021 | Ledvina et al. | |
| 2021/0014788 A1 | 1/2021 | Sahin et al. | |
| 2021/0173064 A1 | 6/2021 | Yoon et al. | |

(Continued)

FOREIGN PATENT DOCUMENTS

| EP | 4 287 762 | 12/2023 |
|---|---|---|
| KR | 10-2021-0003736 | 1/2021 |
| WO | WO 2022/270983 | 12/2022 |

OTHER PUBLICATIONS

International Search Report dated Oct. 28, 2022 issued in counterpart application No. PCT/KR2022/010818, 8 pages.

(Continued)

*Primary Examiner* — Jean B Corrielus

(74) *Attorney, Agent, or Firm* — The Farrell Law Firm, P.C.

(57) ABSTRACT

Methods and devices are provided for ultra-wideband (UWB) communication. A first UWB device generates a discovery message providing information used for discovery of the first UWB device. The first UWB device broadcasts the discovery message through a narrowband (NB) discovery channel. The NB discovery channel is not associated with a UWB channel. The UWB channel is one of a plurality of candidate UWB channels allocated for the UWB communication.

16 Claims, 25 Drawing Sheets

(56) References Cited

U.S. PATENT DOCUMENTS

2022/0137177 A1\* 5/2022 Hammerschmidt ........................ H04W 72/0446 455/456.1
2022/0400366 A1\* 12/2022 Ha .......................... H04W 4/80

OTHER PUBLICATIONS

Mingyu Lee et al., "Narrowband / UWB Coupling MAC", IEEE P802.15 Working Group for Wireless Personal Area Neworks (WPANs), Sep. 2021, 15 pages.
J.S. Hammerschmidt et al., "Narrowband Assisted Multi-Millisecond UWB", IEEE P802.15 Working Group for Wireless Personal Area Networks (WPANs), Jul. 2021, 10 pages.
Ravichandran et al., "Design and Analysis of a Dual Radio Node Architecture and Medium Access Control Protocols for Ultra Wide Band Based Sensor Networks", 2007, 9 pgs.
European Search Report dated Sep. 18, 2024 issued in counterpart application No. 22846304.8-1215, 19 pages.

\* cited by examiner

METHOD AND DEVICE FOR ULTRA-WIDEBAND COMMUNICATION

CROSS-REFERENCE TO RELATED APPLICATION(S)

This application is based on and claims priority under 35 U.S.C. § 119(a) to Korean Patent Application Nos. 10-2021-0096622 and 10-2022-0002898, filed on Jul. 22, 2021, and Jan. 7, 2022, respectively, in the Korean Intellectual Property Office, the disclosure of which is incorporated herein by reference in its entirety.

BACKGROUND

1. Field

The disclosure relates generally to ultra-wideband (UWB) communication, and more particularly, to a method and device for providing a UWB service through an UWB channel and a narrowband (NB) channel.

2. Description of Related Art

In an Internet of things (IoT), information is exchanged and processed between distributed components such as objects. Internet of everything (IoE) technology is a combination of a big data processing technology based on a connection to a cloud server and the IoT technology. Important technology elements needed to implement the IoT include, for example, sensing technology, wired/wireless communication and network infrastructure, service interface technology, and security technology. Technologies for connection between objects include, for example, a sensor network, machine to machine (M2M), and machine type communication (MTC).

In the IoT environment, an intelligent Internet technology service may be provided that collects and analyzes data generated from connected objects. The IoT may be applicable in the fields of smart home, smart building, smart city, smart car or connected car, smart grid, healthcare, smart home appliance, and advanced medical service, for example, through the convergence and merging between existing information technology and various industries.

As various services may be provided along with the development of wireless communication systems, a method of effectively providing these services is required.

SUMMARY

The disclosure provides a method for collision avoidance and efficient use of a UWB device.

The disclosure provides a method for performing advertising, device discovery, and/or connection setup using in-band, instead of out-of-band, and a structure of a UWB device for the same.

The disclosure provides a method for operating at least one subchannel among channels allocated for UWB as an NB channel for advertising, device discovery, and/or connection setup.

The disclosure provides a method for dividing NB channels into a mirroring channel coupled to a UWB channel and a discovery channel not coupled to the UWB channel and operating the NB channels.

The disclosure provides a method for performing a device discovery procedure regardless of whether UWB is used using a discovery channel not coupled to a UWB channel.

The disclosure provides a method in which device discovery and connection setup are performed on the same channel.

According to an embodiment, a method for UWB communication is provided. A first UWB device generates a discovery message providing information used for discovery of the first UWB device. The first UWB device broadcasts the discovery message through an NB discovery channel. The NB discovery channel is not associated with an UWB channel. The UWB channel is one of a plurality of candidate UWB channels allocated for the UWB communication.

According to an embodiment, a method for UWB communication is provided. A second UWB receives, from a first UWB device, a discovery message providing information used for discovery of the first UWB device, through an NB discovery channel. The second UWB device obtains the discovery message. The NB discovery channel is not associated with an UWB channel. The UWB channel is one of a plurality of candidate UWB channels allocated for the UWB communication.

According to an embodiment, a first UWB device is provided and includes at least one transceiver and a controller connected to the at least one transceiver. The controller is configured to generate a discovery message providing information used for discovery of the first UWB device. The controller is also configured to broadcast the discovery message through a NB discovery channel. The NB discovery channel is not associated with an UWB channel. The UWB channel is one of a plurality of candidate UWB channels allocated for UWB communication.

According to an embodiment, a second UWB device is provided and includes at least one transceiver and a controller connected to the at least one transceiver. The controller is configured to receive, from a first UWB device, a discovery message providing information used for discovery of the first UWB device, through an NB discovery channel. The controller is also configured to obtain the discovery message. The NB discovery channel is not associated with an UWB channel. The UWB channels is one of a plurality of candidate UWB channels allocated for UWB communication.

BRIEF DESCRIPTION OF THE DRAWINGS

The above and other aspects, features, and advantages of the disclosure will be more apparent from the following detailed description when taken in conjunction with the accompanying drawings, in which.

DETAILED DESCRIPTION

Figure 1A:
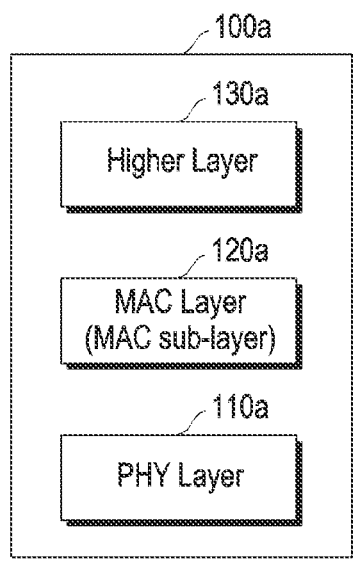
FIG. 1A illustrates an example of a UWB device, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

Some elements may be exaggerated or schematically shown. The size of each element does not necessarily reflect the real size of the element.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skill in the art of the category of the disclosure.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices may generate means for performing functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more CPUs in a device or a security multimedia card. According to embodiments, a unit may include one or more processors.

As used herein, the term "terminal" or "device" may also be referred to as a mobile station (MS), a user equipment (UE), a user terminal (UT), a terminal, a wireless terminal, an access terminal (AT), a subscriber unit, a subscriber station (SS), a wireless device, a wireless communication device, a wireless transmit/receive unit (WTRU), a mobile node, a mobile, or other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include an M2M terminal and an MTC terminal/device, but is not limited thereto. In the disclosure, the terminal may be referred to as an electronic device or simply as a device.

Hereinafter, the operational principle of the disclosure is described below with reference to the accompanying drawings. The terms as used herein are defined considering the functions in the disclosure and may be replaced with other terms according to the intention or practice of the user or operator. Therefore, the terms should be defined based on the overall disclosure.

Although a communication system using UWB is described in connection with embodiments of the disclosure, as an example, embodiments of the disclosure may also apply to other communication systems with similar technical background or features. For example, a communication system using Bluetooth™ or ZigBee™ may be included therein. Further, embodiments of the disclosure may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and UWB. A wireless network in which such a wireless network technology is implemented may include a plurality of electronic devices.

According to the definitions by the Federal Communications Commission (FCC), UWB may refer to a wireless communication technology that uses a bandwidth of 500 MHz or more or a bandwidth corresponding to a center frequency of 20% or more. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known).

A ranging device (RDEV) may be a device capable of performing UWB ranging. Herein, the ranging device may be an RDEV or an enhanced RDEV (ERDEV) as defined in, for example, IEEE 802.15.4/4z. The ranging device may be referred to as a UWB device.

An advertiser may be a device (e.g., ranging device) that transmits a message for discovery. For example, the advertiser may be a device that transmits (or broadcasts) an advertisement message through a mirroring channel or transmits (or broadcasts) a discovery beacon (message) through a discovery channel.

A scanner may be a device (e.g., ranging device) that receives a message for discovery. For example, the scanner may be a device that scans the mirroring channel to receive an advertisement message or scans the discovery channel to receives a discovery beacon (message). Herein, the scanner may be referred to as an observer.

A controller may be a device (e.g., ranging device) that defines and controls ranging control messages (RCM) (or control messages). The controller may define and control ranging features by sending the control message.

A controlee may be a device (e.g., ranging device) using a ranging parameter in the RCM (or control message) received from the controller. The controlee may utilize the ranging features as configured via the control message from the controller.

An initiator may be a device (e.g., ranging device) that initiates a ranging exchange. The initiator may initiate the ranging exchange by sending the first ranging frame (RFRAME), which is a ranging initiation message.

A responder may be a device (e.g., ranging device) that responds to the Initiator in a ranging exchange. The responder may respond to the ranging initiation message received from the initiator.

In-band communication may be data communication that uses UWB as an underlying wireless technology.

Out-of-band (OOB) communication may be data communication that does not use UWB as an underlying wireless technology.

An UWB session may be a period from when the controller and the controlee start communication through UWB until the communication stops. In the UWB session, an RFRAIVIE may be transferred, a data frame may be transferred, or both an RFRAIVIE and a data frame may be transferred.

An UWB session identifier (ID) may be an ID (e.g., a 32-bit integer) that identifies the UWB session, shared between the controller and the controller.

An UWB session key may be a key used to protect the UWB Session. The UWB session key may be used to generate a scrambled timestamp sequence (STS). Herein, the UWB session key may be a UWB ranging session key (URSK), and may be abbreviated as a session key.

An UWB subsystem (UWBS) may be a hardware component implementing the UWB PHY and MAC specifications included in the UWB device. Herein, the UWB PHY and MAC specifications may be, for example, the PHY and MAC specifications defined in, for example, IEEE 802.15.4/ 4z. Herein, the UWBS may be referred to as a UWB component.

An UWB-enabled application may be an application for a service (UWB service). Herein, an UWB-enabled application may be abbreviated as an application or a UWB application.

A service may be an implementation of a use case that provides a service to an end-user. Herein, the service may be referred to as a UWB service.

Service data may be data defined by a service provider that needs to be transferred between two ranging devices to implement a service.

A service provider may be an entity that defines and provides hardware and software required to provide a specific service to an end-user.

An STS may be a ciphered sequence for increasing the integrity and accuracy of ranging measurement timestamps.

Unlike a static STS, a dynamic STS mode may be an operation mode in which the STS is not repeated during a ranging session. In this mode, the STS may be managed by the ranging device, and the ranging session key for generating STS may be managed by a secure component.

A static STS mode is an operation mode in which STS is repeated during a session, and does not need to be managed by the secure component.

A secure channel may be a data channel that prevents overhearing and tampering.

A secure component may be an entity (e.g., a secure element (SE) or a trusted execution environment (TEE))

having a defined security level that interfaces with UWBS for the purpose of providing RDS to UWBS, when dynamic STS is used, for example.

Secure ranging may be ranging based on STS generated through a strong encryption operation.

A UWB channel may be one of the candidate UWB channels allocated for UWB communication. Candidate UWB channels allocated for UWB communication may be channels allocated for UWB communication as defined in IEEE 802.15.4/4z. The UWB channel may be used for UWB communication (e.g., UWB ranging and/or transaction). For example, the UWB channel may be used for transmission/reception of a ranging frame RFRAME and/or transmission/reception of a data frame. In an embodiment, one or a plurality of UWB channels may be operated together.

An NB channel" may be a channel having a narrower bandwidth than the UWB channel. In an embodiment, the NB channel may be a subchannel of one of the candidate UWB channels allocated for UWB communication or a channel using a specific bandwidth of another available band (e.g., a portion of an industrial, scientific, and medical (ISM) band). Candidate UWB channels allocated for UWB communication may be channels allocated for UWB communication as defined in IEEE 802.15.4/4z. The NB channel may be used for advertising, device discovery, and/or connection setup for additional parameter negotiation/authentication. For example, the NB channel may be used for transmission and reception of a discovery beacon (message), an advertisement message, an additional advertising message, a connection request message, and/or a connection confirmation message. In an embodiment, one or a plurality of NB channels may be operated together. In an embodiment, the NB channel may be used for in-band communication, like the UWB channel.

A mirroring channel is one of the NB channels and may be used to provide information about device-to-device discovery and/or UWB channel occupancy. The mirroring channel may be coupled (or synchronized) with the UWB channel. For discovery, an advertisement message may be transmitted through a mirroring channel. In an embodiment, the advertisement message may be transmitted through the mirroring channel when the UWB channel (communication) is activated (UWB activation case). Herein, the mirroring channel may be referred to as an advertisement channel, an NB advertisement channel, or an NB mirroring channel. The advertisement message may be referred to as a first advertisement message or an NB advertisement message. In an embodiment, one or more mirroring channels may be operated together.

A discovery channel is one of the NB channels and may be used for device-to-device discovery and/or connection setup. The discovery channel may not be coupled (or synchronized) with the UWB channel. For discovery, a discovery beacon (message) may be transmitted through a discovery channel. In an embodiment, the discovery beacon (message) may be transmitted through the discovery channel regardless of whether the UWB channel (communication) is activated. Specifically, the discovery beacon (message) may be transmitted through the discovery channel not only in the UWB activation case but also in the UWB de-activation case. Herein, the discovery channel may be referred to as an NB discovery channel. The discovery beacon may be referred to as a discovery message, an NB discovery beacon, or an NB discovery message. In an embodiment, one or more discovery channels may be operated together.

Hereinafter, embodiments of the disclosure are described with reference to the accompanying drawings.

The disclosure provides a method for collision avoidance and efficient use of a UWB device.

The disclosure provides a method for performing advertising, device discovery, and/or connection setup using in-band, instead of out-of-band, and a structure of a UWB device for the same. Thus, the entire operation for providing the UWB service may be performed through in-band communication. In this case, it is possible to provide a full UWB service for devices without an additional OOB communication module, such as a Bluetooth low energy (BLE) communication module, other than the UWB communication module.

The disclosure provides a method for operating at least one subchannel among channels allocated for UWB as an NB channel for advertising, device discovery, and/or connection setup. Herein, an NB channel used for advertising, device discovery, and/or connection setup may be distinguished from the channel (UWB channel) used for UWB ranging and/or transaction.

The disclosure provides a method for dividing NB channels into a mirroring channel coupled to a UWB channel and a discovery channel not coupled to the UWB channel and operating the NB channels.

The disclosure provides a method for performing a device discovery procedure regardless of whether UWB is used using a discovery channel not coupled to a UWB channel.

The disclosure provides a method in which device discovery and connection setup are performed on the same channel.

FIG. 1A illustrates an architecture of a UWB device, according to an embodiment.

Referring to FIG. 1A, a UWB device 100a includes at least one PHY layer 110a, a MAC layer (MAC sublayer) 120a, and a higher layer 130a.

(1) PHY Layer

The at least one PHY layer 110a may include a transceiver with a low-level control mechanism. Herein, the transceiver may be referred to as an RF transceiver or a radio transceiver.

The at least one PHY layer 110a may include at least one first transceiver supporting a UWB channel and at least one second transceiver supporting an NB channel having a narrower bandwidth than the UWB channel. Herein, the first transceiver may be referred to as a UWB transceiver. The second transceiver may be referred to as an NB transceiver.

In another embodiment, the at least one PHY layer 110a may include a transceiver (dual-channel transceiver) that supports both the UWB channel and the NB channel.

The PHY layer 110a may support at least one of the following functions:
  Transceiver activation and deactivation function (transceiver on/off function)
  Energy detection function
  Channel selection function
  Clear channel assessment (CCA) function
  Synchronization function
  Low-level signaling function
  UWB ranging, positioning and localization functions
  Spectrum resource management function
  Function to transmit/receive packets through physical medium (2) MAC Layer The MAC layer 120a provides an interface between the upper layer 130a and the PHY layer 110a.

The MAC layer 120a may provide two services as follows:

MAC data service: a service that enables transmission and reception of a MAC protocol data unit (PDU) through the PHY MAC management service: a service interfacing to MAC sublayer management entity (MLME) service access point (SAP) (MLME-SAP)

The MAC layer 120a may support at least one of the following functions.

Device discovery and connection setup function

Channel access function (function of access to physical channel (e.g., NB channel/UWB channel))

Synchronization function (e.g., synchronization between NB channel (mirroring channel) and UWB channel)

Interference mitigation function based on energy detection

Functions related to narrowband signaling

Guaranteed timeslot (GTS) management function

Frame delivery function

UWB ranging function

PHY parameter change notification function

Security function (3) Upper Layer

The upper layer 130a may include a network layer providing functions, such as network configuration and message routing, and/or an application layer providing an intended function of the device.

The application layer may be a UWB-enabled application layer for providing a UWB service.

Figure 1B:
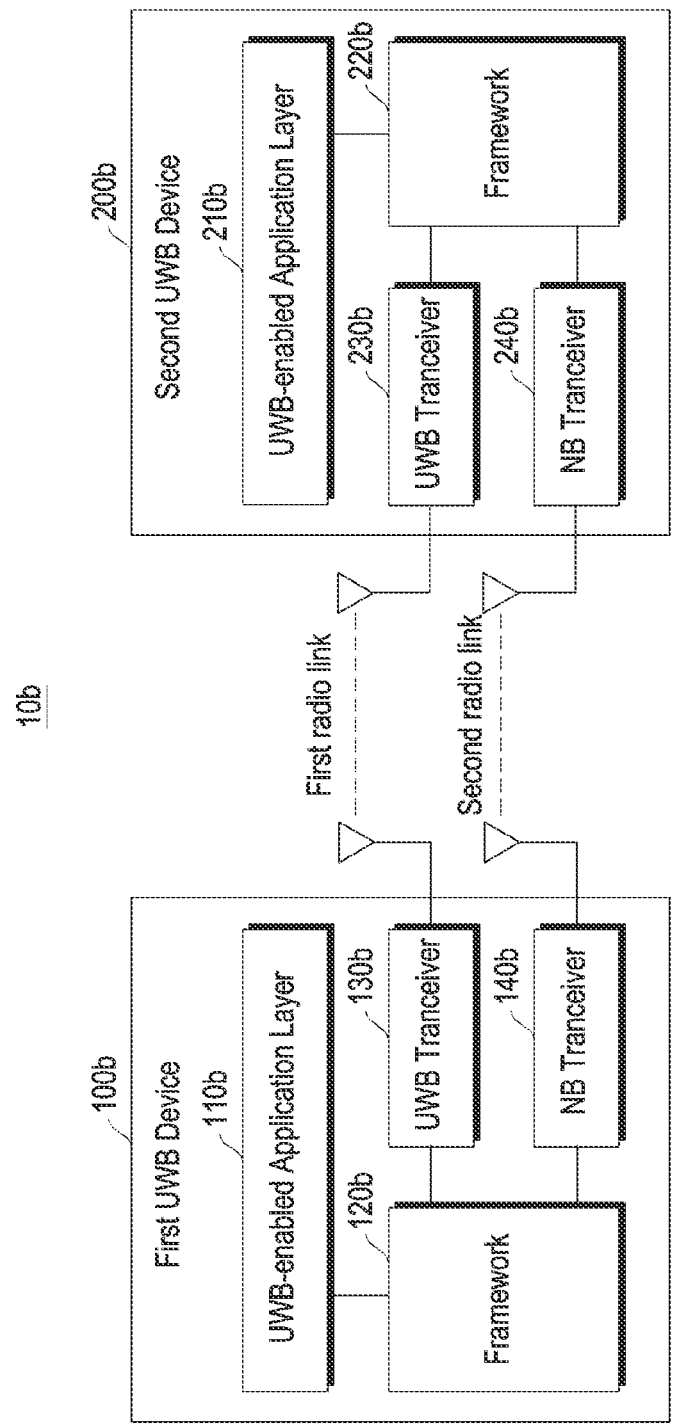
FIG. 1B illustrates a communication system including a UWB device, according to an embodiment.

FIG. 1B illustrates a communication system including a UWB device, according to an embodiment.

Referring to FIG. 1B, a communication system 10b includes a first UWB device 100b and a second UWB device 200b. The first UWB device 100b and/or the second UWB device 200b of FIG. 1B may be an example of the UWB device 100a of FIG. 1A.

The first UWB device 100b includes a UWB-enabled application layer 110b, a framework 120b, at least one UWB transceiver 130b, and at least one NB transceiver 140b. The second UWB device 200b includes a UWB-enabled application layer 210b, a framework 220b, at least one UWB transceiver 230b, and at least one NB transceiver 240b.

In FIG. 1B, the UWB transceiver and the NB transceiver of each device are illustrated as separate components, but the components are divided according to their operations/functions. Specifically, the UWB transceiver and the NB transceiver are not limited as implemented as separate physical components (e.g., separate chipsets). Accordingly, the UWB transceiver and the NB transceiver each may be implemented as a separate chipset, or the UWB transceiver and the NB transceiver may be implemented as a single integrated chipset.

The UWB-enabled application layers 110b and 210b may be upper application layers for UWB services.

The framework 120b or 220b may collectively manage the UWB transceiver 130b or 230b and the NB transceiver 140b or 240b. In an embodiment, the framework 120b or 220b may support a function to control UWB/NB communication (e.g., medium access control (MAC) or UWB/NB transceiver synchronization function) and/or a function for communicating obtained information to a higher application layer 110b or 210b.

The UWB transceiver 130b or 230b may support at least one of candidate UWB channels allocated for UWB communication. For example, the UWB transceiver 130b or 230b may support at least one UWB channel. Example candidate UWB channels allocated for UWB communication may be shown in Table 1 below.

TABLE 1

| Band group[a] (decimal) | Channel number (decimal) | Center frequency, $f_c$ (MHz) | Band width (MHz) | Mandatory/ Optional |
| --- | --- | --- | --- | --- |
| 0 | 0 | 499.2 | 499.2 | Mandatory below 1 GHz |
| 1 | 1 | 3494.4 | 499.2 | Optional |
|  | 2 | 3993.6 | 499.2 | Optional |
|  | 3 | 4492.8 | 499.2 | Mandatory in low band |
| 2 | 4 | 3993.6 | 1331.2 | Optional |
|  | 5 | 6489.6 | 499.2 | Optional |
|  | 6 | 6988.8 | 499.2 | Optional |
|  | 7 | 6489.6 | 1081.6 | Optional |
|  | 8 | 7488.0 | 499.2 | Optional |
|  | 9 | 7987.2 | 499.2 | Mandatory in high band |
|  | 10 | 8486.4 | 499.2 | Optional |
|  | 11 | 7987.2 | 1331.2 | Optional |
|  | 12 | 8985.6 | 499.2 | Optional |
|  | 13 | 9484.8 | 499.2 | Optional |
|  | 14 | 9984.0 | 499.2 | Optional |
|  | 15 | 9484.8 | 1354.97 | Optional |

[a]Note that bands indicate a sequence of adjacent HRP UWB center frequencies: band 0 is the sub-gigahertz channel, band 1 has the low-band HRP UWB channels, and band 2 has the high-band channels.

In an embodiment, at least one of the channels in Table 1 may be assigned as a UWB channel supported by the UWB transceiver 130b or 230b. For example, channel number 5 and/or 9 of Table 1 may be allocated as a UWB channel.

At least one UWB channel supported by the UWB transceiver 130b or 230b may be used for UWB communication (e.g., UWB ranging and/or transaction). For example, at least one UWB channel supported by the UWB transceiver 130b or 230b may be used for transmitting/receiving a ranging frame RFRAME and/or a data frame.

The NB transceiver 140b or 240b may support at least one NB channel having a narrower bandwidth (e.g., 50 MHz or less) than a UWB channel. At least one NB channel supported by the NB transceiver 140b or 240b may be used for advertisement (discovery) and/or narrowband signaling.

In an embodiment, the NB channel may be a subchannel of one of the candidate UWB channels allocated for UWB communication. Example candidate UWB channels allocated for UWB communication may be shown in Table 1 above.

In another embodiment, the NB channel may be a channel using a specific bandwidth of another available band (e.g., some of ISM bands).

The NB channel may be used for in-band communication, like the UWB channel.

As shown in Table 1 above, the candidate UWB channels mainly have a bandwidth of 500 MHz or more. Therefore, when it is used as it is for advertisement (discovery), it is disadvantageous in power spectral density (energy detection), so it may be necessary to divide the corresponding channel into a plurality of subchannels for advertisement (discovery).

In an embodiment, at least one of the subchannels into which one of the channels of Table 1 is divided or at least one of channels using a specific bandwidth of an available band (e.g., part of the ISM band) may be allocated as the mirroring channel. The mirroring channel may be used to transfer the advertisement message.

Further, at least one of the remaining subchannel(s) or channel(s) not allocated as the mirroring channel may be allocated as a channel for connection setup (connection setup channel). Herein, the channel for connection setup may be referred to as a second subchannel, an NB connection setup channel, or a sub advertisement channel.

The connection setup channel may be used for transferring an additional advertisement message including additional advertising information not transmitted through the advertisement channel, for additional parameter negotiation, or for authentication. Herein, the additional advertisement message may be referred to as a second advertisement message or an additional NB advertisement message.

At least one of the subchannels into which one of the channels of Table 1 is divided or at least one of channels using a specific bandwidth of an available band (e.g., part of the ISM band) may be allocated as the discovery channel. Herein, the discovery channel may be used to transfer discovery beacons and for connection setup. As such, when the discovery channel is used, device discovery and connection setup may be performed through one channel. In contrast, when using the mirroring channel, a separate connection setup channel needs to be allocated for connection setup.

As described above, the NB channel has a narrower bandwidth than the UWB channel. However, the band of the NB channel may be the same as or different from the band of the UWB channel.

For example, the NB channel and the UWB channel may use different bands. For example, the channel number (or band group number) of the candidate UWB channel including the subchannel(s) allocated as the NB channel and the channel number (or band group number) of the candidate UWB channel allocated as the UWB channel may be different from each other.

As another example, the NB channel and the UWB channel may use the same band. For example, the channel number (or band group number) of the candidate UWB channel including the subchannel(s) allocated as the NB channel and the channel number (or band group number) of the candidate UWB channel allocated as the UWB channel may be identical to each other.

The first UWB device 100b and the second UWB device 200b may perform a UWB communication (procedure) (in-band communication) through a first radio link (UWB channel) established through the UWB transceiver 110b of the first UWB device 100b and the UWB transceiver 210b of the second UWB device 200b.

The first UWB device 100b and the second UWB device 200b may perform an NB communication (procedure) (in-band communication) through a second radio link (NB channel) established through the NB transceiver 110b of the first UWB device 100b and the NB transceiver 210b of the second UWB device 200b.

Hereinafter, a method in which the UWB device performs NB communication (procedure) and UWB communication (procedure) is described with reference to FIG. 2.

Figure 2:
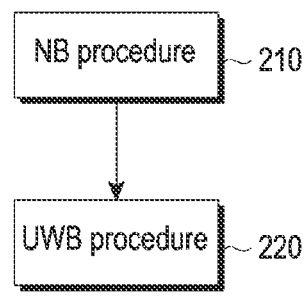
FIG. 2 illustrates a method for performing an NB procedure and a UWB procedure by a UWB device, according to an embodiment.

FIG. 2 illustrates a method for performing an NB procedure and a UWB procedure by a UWB device, according to an embodiment.

The UWB device of FIG. 2 may be, e.g., the UWB device of FIG. 1A or 1B.

Referring to FIG. 2, the UWB device may perform the NB procedure 210 and the UWB procedure 220. The NB procedure 210 and UWB procedure 220 may be managed or controlled by the MAC layer (entity) of the UWB device.

(1) NB Procedure

Herein, the NB procedure 210 refers to a procedure performed using at least one NB channel. The NB procedure 210 may be performed before the UWB procedure 220.

The NB procedure 210 may include at least one of the following operations.

- An operation in which the UWB device transmits and/or receives an advertisement message through at least one mirroring channel (advertising operation)
- An operation in which the UWB device transmits and/or receives a discovery beacon (message) through at least one discovery channel (discovery operation)
- An operation in which the UWB device transmits and/or receives an additional advertisement message, a connection request message, and/or a connection confirmation message through at least one connection setup channel (first connection setup operation)
- An operation in which the UWB device transmits and/or receives a connection request message and/or a connection confirmation message through at least one discovery channel (second connection setup operation)

(2) UWB Procedure

Herein, the UWB procedure 220 refers to a procedure performed using at least one UWB channel.

The UWB procedure 220 may include at least one of the following operations:

- An operation in which a UWB device performs UWB ranging with another UWB device (UWB ranging operation)
- An operation in which a UWB device exchanges service data with another UWB device (transaction operation)

Figure 3:
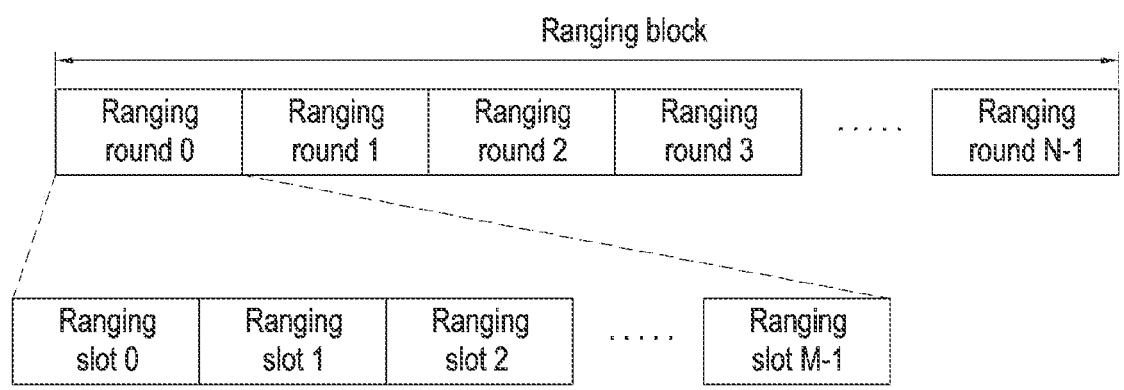
FIG. 3 illustrates a structure of a ranging block and round used for UWB ranging, according to an embodiment.

FIG. 3 illustrates a structure of a ranging block and round used for UWB ranging, according to an embodiment.

Herein, the ranging block refers to a time period for ranging. The ranging round may be a period of sufficient duration to complete one entire range-measurement cycle in which a set of UWB devices participating in a ranging exchange involves. The ranging slot may be a sufficient period for transmission of at least one ranging frame (RFRAME) (e.g., ranging initiation/reply/final message, etc.).

As shown in FIG. 3, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds. This may be configured through a control message from the controller.

Herein, ranging round may be abbreviated as a round, ranging block as a block, and ranging slot as a slot.

Hereinafter, embodiments of the UWB ranging operation of the UWB procedure are described with reference to FIGS. 4 and 5.

Figure 4:
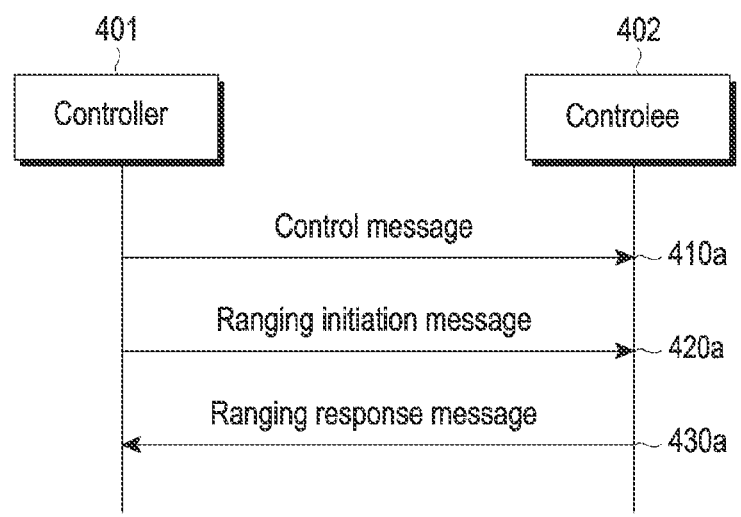
FIG. 4 illustrates a UWB ranging operation, according to an embodiment.

FIG. 4 illustrates a UWB ranging operation, according to an embodiment.

The UWB ranging operation of FIG. 4 may be an example of the UWB ranging operation of the UWB procedure of FIG. 2. The UWB ranging operation of FIG. 4 may be performed through a UWB channel.

In FIG. 4, UWB ranging may be, for example, single-sided two-way ranging (SS-TWR) or double-sided two-way ranging (DS-TWR).

In FIG. 4, it is assumed that a controller 401 serves as an initiator, and a controlee 402 serves as a responder.

Referring to operation 410a, the controller 401 transmits a control message (ranging control message) for controlling UWB ranging to the controlee 402. For example, the controller 401 may transmit a control message to the controlee 402 through a UWB channel.

In an embodiment, the control message may include information about the role (e.g., initiator or responder) of the UWB device, ranging slot index information, and/or address information about the UWB device.

Referring to operation 420a, the controller (initiator) 401 transmits a ranging initiation message for starting the ranging exchange to the controlee (responder) 402. For example, the controller (initiator) 401 may transmit a ranging initiation message to the controlee (responder) 402 through the UWB channel.

Referring to operation 430a, the controlee (responder) 402 transmits a ranging response message corresponding to the ranging initiation message to the controller (initiator) 401. For example, the controlee (responder) 402 may transmit a ranging response message to the controller (initiator) 403 through the UWB channel.

In an embodiment, the ranging response message may further include first measurement report information. The first measurement report message may include, for example, an angle of arrival (AoA) measurement, a reply time measured by the responder, and/or a list of round-trip time measurements for responders and responder addresses. The reply time may indicate a time difference between the reception time of the ranging initiation message and the transmission time of the ranging reply message at the responder side. Based on this, SS-TWR may be performed. Calculation of time-of-flight (ToF) and distance/direction/position through SS-TWR follows the scheme defined in IEEE 802.15.4z.

In the case of the DS-TWR, the controller (initiator) 401 may further transmit a ranging response message for completing ranging to the controlee (responder) 402. For example, the controller (initiator) 401 may further transmit the ranging final message to the controlee (responder) 402 through the UWB channel.

The ranging final message may further include second measurement report (measurement report) information. The second measurement report information may include an AoA measurement, the round-trip time for the first responder (first round-trip time) and/or a list of reply time measurements for responders and responder addresses. The first round-trip time may indicate a time difference between the ranging reply message from the responder and the ranging final message from the initiator. Based on this, DS-TWR may be performed. Calculation of ToF and distance/direction/position through DS-TWR follows the scheme defined in IEEE 802.15.4z.

Figure 5:
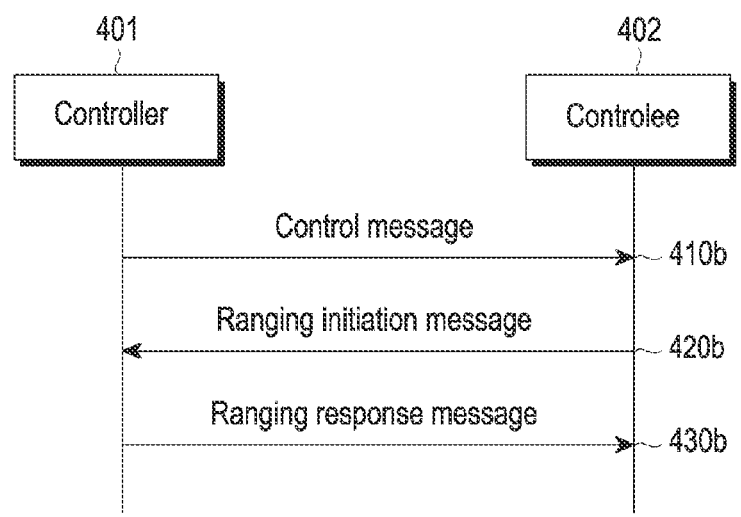
FIG. 5 illustrates a UWB ranging operation, according to another embodiment.

FIG. 5 illustrates a UWB ranging operation, according to another embodiment.

The UWB ranging operation of FIG. 5 may be an example of the UWB ranging operation of the UWB procedure of FIG. 2. The UWB ranging operation of FIG. 5 may be performed through a UWB channel.

In FIG. 5, UWB ranging may be, for example, SS-TWR or DS-TWR.

In FIG. 5, unlike the embodiment of FIG. 4, it is assumed that a controller 401 serves as a responder, and a controlee 402 services as an initiator.

Referring to operation 410b, the controller 401 transmits a control message (ranging control message) for controlling UWB ranging to the controlee 402. For example, the controller 401 may transmit a control message to the controlee 402 through a UWB channel.

The control message may include information about the role (e.g., initiator or responder) of the UWB device, ranging slot index information, and/or address information about the UWB device.

Referring to operation 420b, the controlee (initiator) 402 transmits a ranging initiation message for starting the ranging exchange to the controller (responder) 401. For example, the controlee (initiator) 402 may transmit a ranging initiation message to the controller (responder) 401 through the UWB channel.

Referring to operation 430b, the controller (responder) 401 transmits a ranging response message corresponding to the ranging initiation message to the controlee (initiator) 402. For example, the controller (responder) 401 may transmit a ranging response message to the controlee (initiator) 402 through the UWB channel.

The ranging response message may further include first measurement report information. The first measurement report message may include, for example, an AoA measurement, a reply time measured by the responder and/or a list of round-trip time measurements for responders and responder addresses. The reply time may indicate a time difference between the reception time of the ranging initiation message and the transmission time of the ranging reply message at the responder side. Based on this, SS-TWR may be performed. Calculation of ToF and distance/direction/position through SS-TWR follows the scheme defined in IEEE 802.15.4z.

Meanwhile, in the case of the DS-TWR, the controlee (initiator) 402 may further transmit a ranging response message for completing ranging to the controller (responder) 401. For example, the controlee (initiator) 402 may further transmit the ranging final message to the controller (responder) 401 through the UWB channel.

The ranging final message may further include second measurement report (measurement report) information. The second measurement report information may include an AoA measurement, the round-trip time for the first responder (first round-trip time) and/or a list of reply time measurements for responders and responder addresses. The first round-trip time may indicate a time difference between the ranging reply message from the responder and the ranging final message from the initiator. Based on this, DS-TWR may be performed. Calculation of ToF and distance/direction/position through DS-TWR follows the scheme defined in IEEE 802.15.4z.

An embodiment in which a discovery procedure between devices is performed only by the advertisement message transmitted through the mirroring channel is described below with reference to FIGS. 6 to 8.

Figure 6:
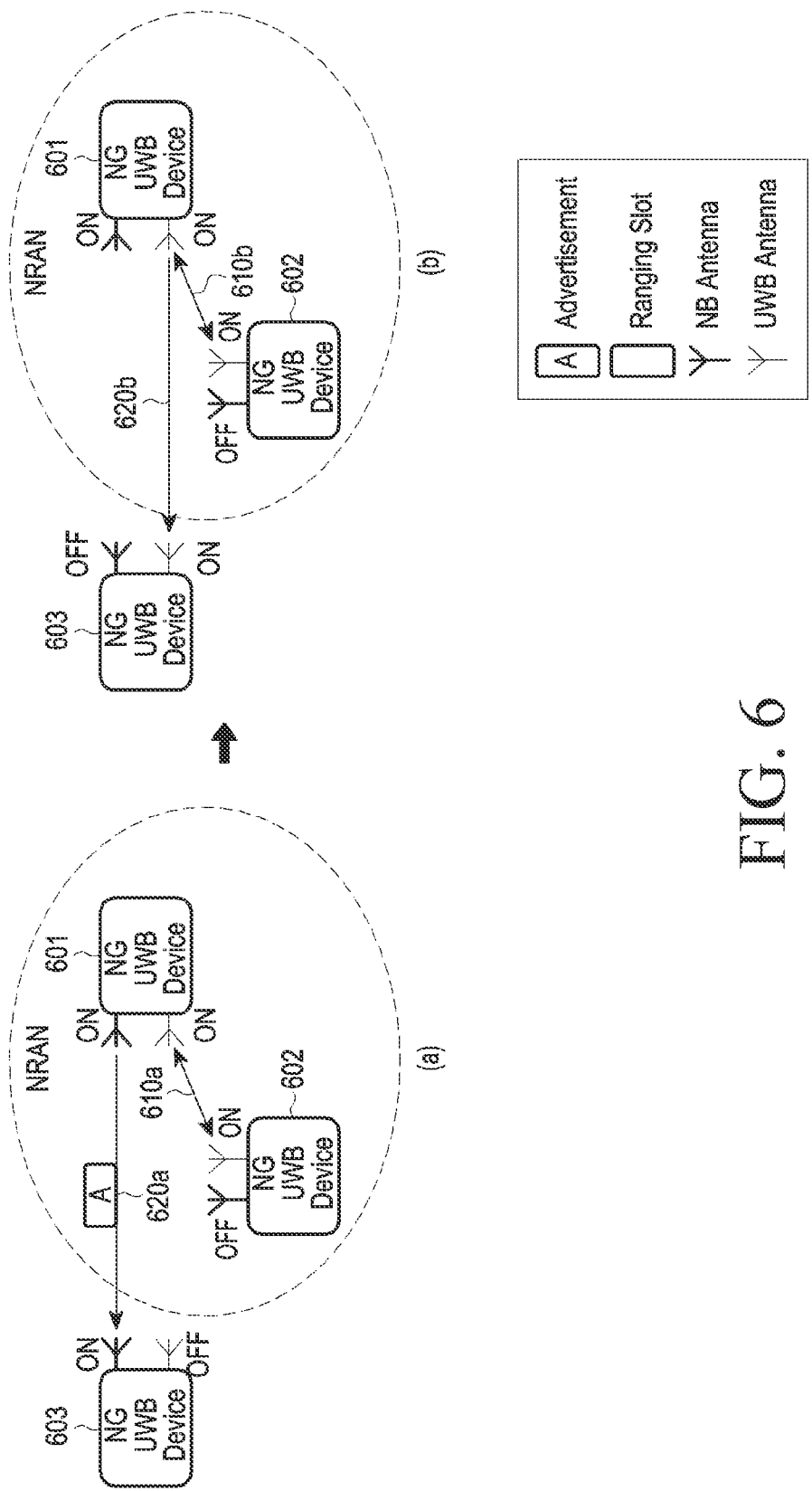
FIG. 6 illustrates an operation by a UWB device in a ranging area network, according to an embodiment.

FIG. 6 illustrates an operation by a UWB device in a ranging area network, according to an embodiment.

Herein, a ranging area network (RAN) may include a plurality of UWB devices performing UWB ranging. The RAN may be referred to as a new generation (NG) RAN (NRAN), and the UWB device may be referred to as an NG UWB device.

In FIG. 6, it is assumed that a first UWB device 601 of the NRAN serves as a controller and an advertiser. In the NRAN of FIG. 6, the first UWB device 601 may perform an NB procedure. The first UWB device 601 may perform a UWB procedure with a second UWB device 602 through a previously established UWB session. Each procedure is described below.

(1) NB Procedure

Referring to (a) of FIG. 6, in operation 610a, the first UWB device 601 may perform a UWB ranging operation with the second UWB device 602 through a previously established UWB session. The first UWB device 601 and the second UWB device 602 may perform a UWB ranging operation through their respective UWB antennas. Each device's UWB antenna may be connected to each device's UWB transceiver, and the UWB transceiver may support at least one UWB channel.

In operation 620a, the first UWB device 601 may transmit an advertisement message, and a third UWB device 603 may receive the advertisement message. The first UWB device 601 may broadcast the advertisement message through the NB antenna of the first UWB device 601, and the third UWB device 603 may receive the advertisement message through the NB antenna of the third UWB device 603. Each device's NB antenna may be connected to each device's NB transceiver, and the NB transceiver may support at least one NB channel.

In (a) of FIG. 6, the first UWB device 601 keeps the NB transceiver (or NB antenna) in the active state (on) for transmission of the advertisement message and keeps the UWB transceiver (or UWB antenna) in the active state (on) to perform UWB ranging. Further, the second UWB device 602 keeps the UWB transceiver (or UWB antenna) in the active state (on) to perform UWB ranging but, since reception of the advertising message is unnecessary, may keep the NB transceiver (or NB antenna) in the inactive state (off). Further, the third UWB device 603 keeps the UWB transceiver (or UWB antenna) in the active state (on) to receive the advertisement message but, since UWB ranging has not been performed yet, may keep the UWB transceiver (or UWB antenna) in the inactive state (off).

As such, the UWB transceiver (or UWB antenna) and/or NB transceiver (or NB antenna) may be turned on/off depending on the context, thereby saving power consumption.

(2) UWB Procedure

Referring to (b) of FIG. 6, in operation 610b, the first UWB device 601 may perform a UWB ranging operation with the second UWB device 602 through a previously established UWB session. The first UWB device 601 and the second UWB device 602 may perform a UWB ranging operation through their respective UWB antennas. As described above, each device's UWB antenna may be connected to each device's UWB transceiver, and the UWB transceiver may support at least one UWB channel.

In operation 620b, the first UWB device 601 may perform a UWB ranging operation with the third UWB device 603. When the third UWB device 603 obtains information necessary to participate in UWB ranging (UWB procedure) with the first UWB device 601 through operation 620a, the third UWB device 603 may perform UWB ranging with the first UWB device 601. To this end, the third UWB device 603 may switch the UWB transceiver (or UWB antenna) of the third UWB device 603 to the active state (on). Thereafter, the third UWB device 602 may receive a ranging control message from the first UWB device 601 through the UWB antenna and may perform a UWB ranging operation based on the ranging control message. As described above, the UWB antenna may be connected to the UWB transceiver, and the UWB transceiver may support at least one UWB channel.

When the third UWB device 603 performs UWB ranging with the first UWB device 601, the third UWB device 603 may switch the NB transceiver (or NB antenna) of the third UWB device 603 to the inactive state (off) to save power consumption.

In (b) of FIG. 6, the first UWB device 601 keeps the NB transceiver (or NB antenna) in the active state (on) for transmission of the advertisement message and keeps the UWB transceiver (or UWB antenna) in the active state (on) to perform UWB ranging. Further, the second UWB device 602 keeps the UWB transceiver (or UWB antenna) in the active state (on) to perform UWB ranging but, since reception of the advertising message is unnecessary, may keep the NB transceiver (or NB antenna) in the inactive state (off). Further, the third UWB device 603 keeps the UWB transceiver (or UWB antenna) in the active state (on) to perform UWB ranging but, since reception of the advertising message is unnecessary, may keep the NB transceiver (or NB antenna) in the inactive state (off).

As such, the UWB transceiver (or UWB antenna) and/or NB transceiver (or NB antenna) may be turned on/off depending on the context, thereby saving power consumption.

In FIG. 6, it is assumed that the third UWB device 603 functions as a scanner and a controlee, but embodiments of the disclosure are not limited thereto. The third UWB device 603 may serve as a scanner and a controller. In this case, the third UWB device 603 may perform UWB ranging by establishing its own UWB session without participating in the UWB session controlled by another device.

Figure 7:
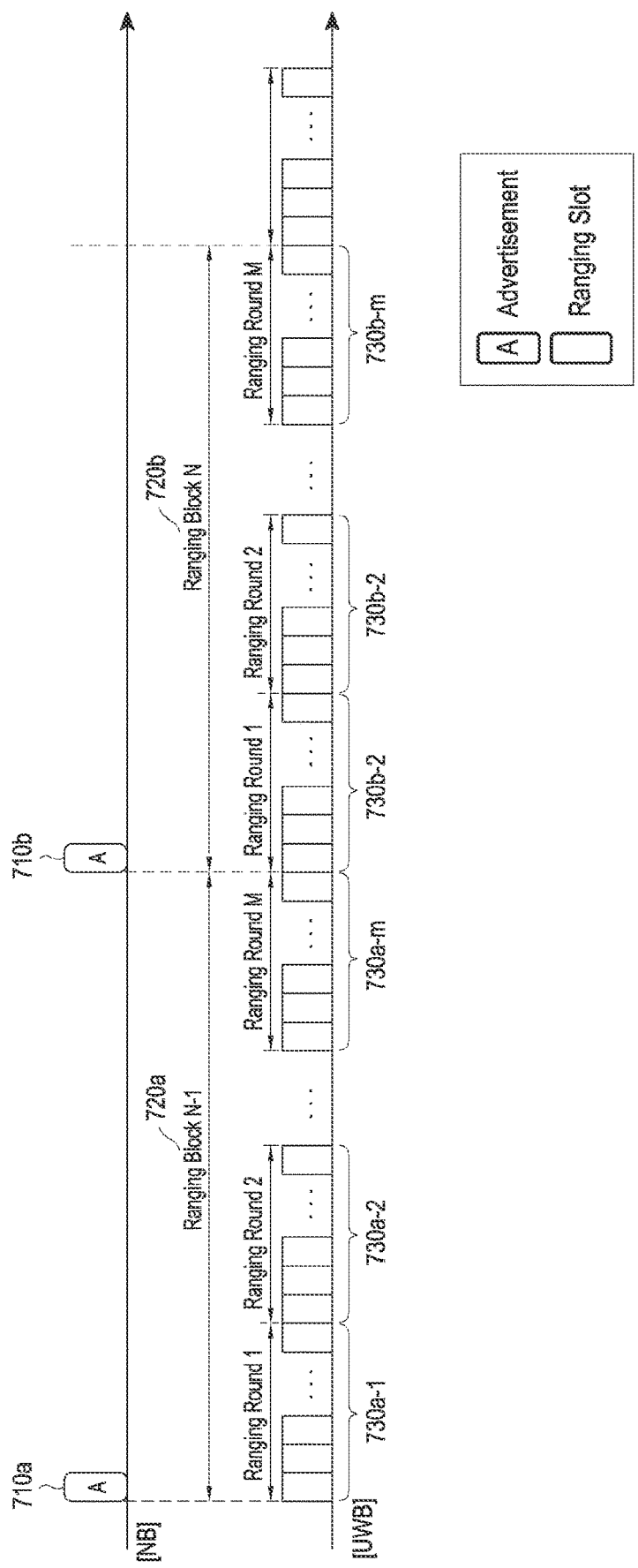
FIG. 7 illustrates a structure of a channel used in a ranging area network, according to an embodiment.

FIG. 7 illustrates a structure of a channel used in a ranging area network, according to an embodiment.

The ranging area network of FIG. 7 may correspond to the ranging area network of FIG. 6.

In FIG. 7, the ranging block, ranging round, and ranging slot transmitted through the UWB channel may be the ranging block, ranging round, and ranging slot used in a pre-configured session (e.g., UWB ranging session) by the UWB device (e.g., the first UWB device 601 of FIG. 6) serving as an advertiser/controller.

Referring to FIG. 7, the mirroring channel and UWB channel may be used in the ranging area network.

The mirroring channel may be used to transmit and/or receive at least one advertisement message. For example, the mirroring channel may be used to transmit/receive a first advertisement message 710a and a second advertisement message 710b.

Further, a connection setup channel may be further used in the ranging area network to transmit and/or receive at least one additional advertisement message, connection request message and/or connection confirmation message.

The UWB channel may be used to transmit and/or receive at least one ranging message for UWB ranging. At least one ranging message may be transmitted/received through ranging blocks 720a and 720b.

As described above with reference to FIG. 3, each ranging block may include at least one ranging round, and each ranging round may include at least one ranging slot. For example, the first ranging block 720a may include M ranging rounds 730a-1, 730a-2, . . . 730a-m. Each ranging round may include a plurality of ranging slots. Further, the second ranging block 720b may include M ranging rounds 730b-1, 730b-2, . . . 730b-m. Each ranging round may include a plurality of ranging slots.

Figure 8A:
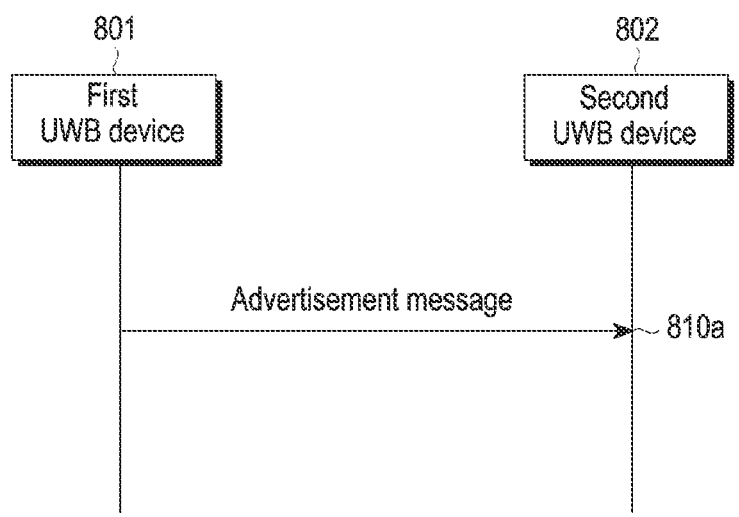
FIG. 8A illustrates an advertising operation, according to an embodiment.

FIG. 8A illustrates an advertising operation, according to an embodiment.

The advertising operation of FIG. 8A may be an example of the advertising operation of the NB procedure 210 of FIG. 2.

In FIG. 8A, a first UWB device 801 may be a UWB device serving as an advertiser and a controller. A second UWB device 802 may be a UWB device serving as a scanner and a controlee.

The advertising operation of FIG. 8A may be an advertising/discovery operation performed through the mirroring channel.

Referring to FIG. 8A, in operation 810a, the first UWB device 801 transmits an advertisement message. The first UWB device 801 may broadcast an advertisement message through at least one mirroring channel. In this case, the second UWB device 802 may scan at least one mirroring channel to receive the advertisement message. Thus, the second UWB device 802 may obtain device discovery and/or advertising information.

The mirroring channel may be a channel previously known to the first UWB device 801 and the second UWB device 802. For example, the mirroring channel may be included in the information provided when installing the related UWB-enabled application, be a hard-coded default channel, or be a channel shared between the first UWB device 801 and the second UWB device 802 in other various manners. As described above, the mirroring channel may be one subchannel(s) among the candidate UWB channels.

The advertisement message may include at least one of information about the start time of the ranging round, information about the channel occupancy time (e.g., information about the channel occupancy time represented as a multiple of time unit (TU)), information about the length of the ranging block, information about the ranging round, or information about the number of active rounds or active round number. Here, the active round may be a ranging round that is actually used (or occupied) among the ranging rounds.

The advertisement message may include information about the session ID of the session (e.g., ranging session) (session ID information) and/or information (address information) about the address (e.g., the MAC address of the UWB device) of the UWB device transmitting the advertisement message. The advertisement message may include numbering information for indicating which number of active round among all the active rounds in the corresponding ranging block the advertisement message corresponds to.

The advertisement message may include information (transmission time information) about the transmission time of the subsequent corresponding advertisement message. For example, the advertisement message or transmission time information may include what number of slot the corresponding advertisement message starts to be transmitted (transmission slot indication information) and/or information about the length of the slot (slot length information).

The advertisement message may include information about the period of the ranging block in which the advertisement message is transmitted. For example, the advertisement message or information about the period of the ranging block may include information (first information) about how many ranging blocks have been skipped or information (second information) about the number of consecutive ranging blocks where an advertisement message is not transmitted.

When the advertising information obtained through the operation of FIG. 8A includes all information necessary to perform UWB communication (UWB procedure), the second UWB device 802 may perform the above-described operations of FIG. 8A and then immediately perform a UWB procedure.

However, depending on an embodiment, the advertising information may include only a part of information necessary to perform the UWB procedure. For example, additional advertising information may be further required to perform UWB communication. Alternatively, additional parameter negotiation or authentication may be further required to perform UWB communication. In this case, an additional advertising operation and/or connection setup operation for advertising information acquisition, additional parameter negotiation and/or authentication may further be performed. This is described below with reference to FIG. 8B.

Figure 8B:
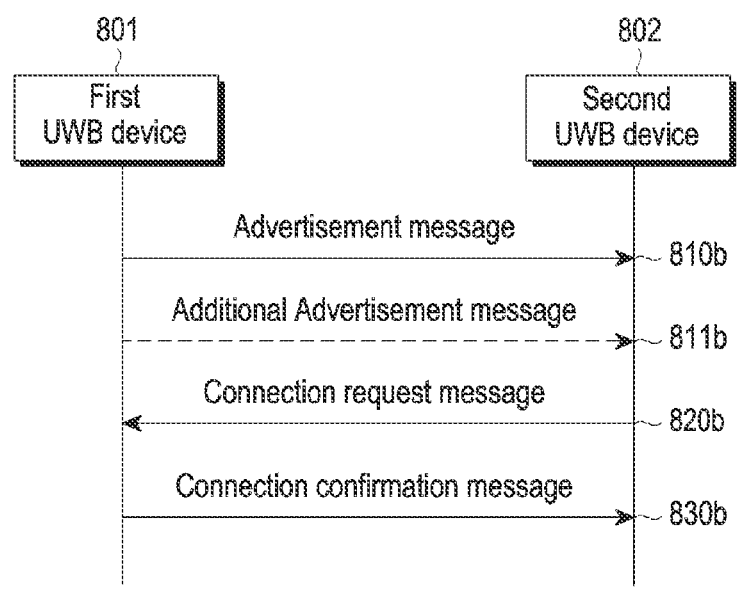
FIG. 8B illustrates an advertising operation and a connection setup operation, according to an embodiment.

FIG. 8B illustrates an advertising operation and a connection setup operation, according to an embodiment.

The advertising operation and the connection setup operation of FIG. 8B may be an example of the advertising operation and the first connection setup operation of the NB procedure of FIG. 2.

In FIG. 8B, a first UWB device 801 may be a UWB device serving as an advertiser and a controller. A second UWB device 801 may be a UWB device serving as a scanner and a controlee.

The advertising operation of FIG. 8B may be an advertising operation performed through the mirroring channel, and the connection setup operation may be a connection setup operation performed through the connection setup channel.

Referring to FIG. 8B, in operation 810b, the first UWB device 801 transmits an advertisement message. For example, the first UWB device 801 may broadcast an advertisement message through at least one mirroring channel. In this case, the second UWB device 802 may scan at least one mirroring channel to receive the advertisement message. Thus, the second UWB device 802 may obtain device discovery and/or advertising information.

As described above, the mirroring channel may be a channel previously known to the first UWB device 801 and the second UWB device 802. Further, the mirroring channel may be one subchannel(s) among the candidate UWB channels.

Further, when additional advertising information is further required, operation 811b may be performed. Operation 811b may be an optional operation.

In operation 811b, the first UWB device 801 may transmit an additional advertisement message. For example, the first UWB device 801 may broadcast an additional advertisement message through a connection setup channel. In this case, the second UWB device 802 may receive the additional advertisement message by scanning the connection setup channel. Information about the NB connection setup channel may be included in the advertisement message of operation 810b.

Through the additional advertising message of operation 811b, the second UWB device 802 may further obtain additional advertising information.

Further, when additional parameter negotiation and/or authentication (connection setup) is required, operations 820b and 830b may be performed. Operations 820b and 830b may be optional operations.

In operation 820b, the second UWB device 802 may transmit a connection request message to the first UWB device. For example, the second UWB device 802 may transmit a connection request message to the first UWB device through a connection setup channel. In an embodiment, the connection request message may include parameter(s) for the performance of the controlee and/or information for authentication.

In operation 830b, the first UWB device 801 may transmit a connection confirmation message to the second UWB device in response to the connection request message. For example, the first UWB device 801 may transmit a connection confirmation message to the second UWB device through a connection setup channel. The connection confirmation message may include parameter(s) for UWB setup, parameter(s) for a session key for protecting the UWB session, and/or information for authentication.

Through the connection setup operations of operations 820b and 830b, negotiation and/or authentication of additional parameters may be performed.

The message exchange operations of operations 820b and 830b may be repeatedly performed as many times as necessary. For example, if additional message exchange is required (i.e., if message exchange is required for additional parameter negotiation and/or authentication) after performing message exchange of operations 820b and 830b once, the message exchange operations of operations 820b and 830b may be further performed as many as necessary on the corresponding connection setup channel (sub advertisement channel).

As compared to the embodiment of FIG. 8A, the embodiment of FIG. 8B may reduce the congestion of the mirroring channel and enables efficient operation of a plurality of NB channels. A compared with the embodiment of FIG. 8B, the embodiment of FIG. 8A may perform a faster NB procedure, thereby shortening the entire time for providing the UWB service. Therefore, it is necessary to flexibly set an appropriate NB procedure and NB channel operation scheme considering the number of UWB devices participating in UWB ranging, the surrounding environment, and the like.

As described above, in FIGS. 6 to 8, the mirroring channel and the UWB channel for transmitting the advertisement message are synchronized or coupled. Therefore, as shown in FIG. 6, to transmit the advertisement message, the UWB antenna (or UWB transceiver) of the UWB device must always be in the activated state. In this case, unless the UWB antenna (or UWB transceiver) of the UWB device is in the activated state, the UWB device cannot transmit discovery, and thus the inter-device discovery procedure may not be performed. Accordingly, regardless of whether the UWB antenna (or UWB transceiver) of the UWB device is in the activated or deactivated state, it is necessary to consider a method (always on discovery) capable of performing the device-to-device discovery procedure. Embodiments for such "always on discovery" are described below.

Also in the following embodiment, the operations through the mirroring channel may be performed with reference to the description made with respect to FIGS. 6 to 8.

An embodiment in which a discovery procedure between devices is performed by an advertisement message transmitted through a mirroring channel and a discovery beacon (message) transmitted through a discovery channel is described below with reference to FIGS. 9 to 17.

In this embodiment, as compared to the above-described embodiment, the discovery procedure may be performed using the advertisement message transmitted through the mirroring channel, as well as the discovery beacon (message) transmitted through the discovery channel. Meanwhile, as described above, the mirroring channel is coupled (or synchronized) with the UWB channel, but the discovery channel is not coupled (or synchronized) with the UWB channel. Accordingly, when the discovery procedure is performed through the discovery message transmitted through the discovery channel, the discovery procedure may be performed regardless of UWB activation. For example, regardless of activation of the UWB antenna (or UWB transceiver) of the UWB device, e.g., even when the UWB antenna (or UWB transceiver) is deactivated, the UWB device may transmit a discovery message through the discovery channel. Thus, "always on discovery" may be performed.

Figure 9:
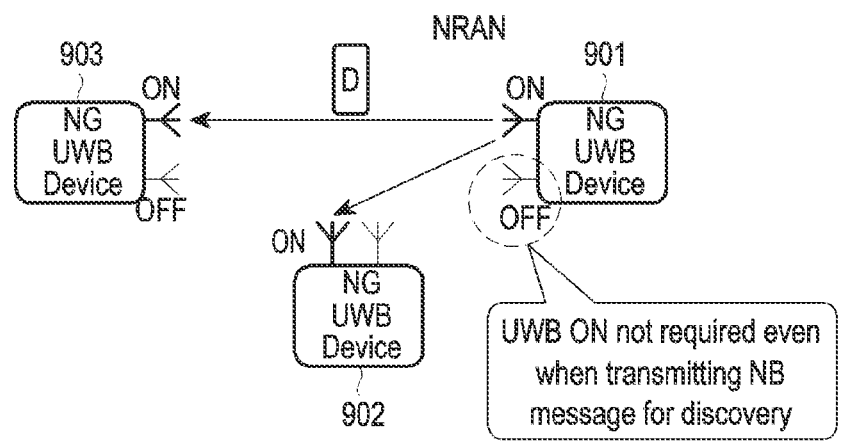
FIG. 9 illustrates an operation by a UWB device in a ranging area network, according to another embodiment.
Figure 9:
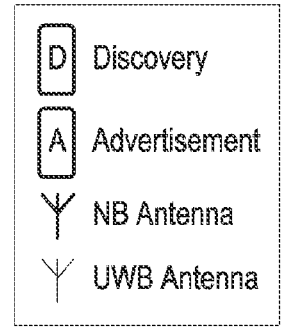

FIG. 9 illustrates an operation by a UWB device in a ranging area network, according to another embodiment.

Herein, a RAN may be a network including a plurality of UWB devices performing UWB ranging. The RAN may be referred to as an NRAN, and the UWB device may be referred to as an NG UWB device.

In FIG. 9, it is assumed that a first UWB device 901 of the NRAN serves as an advertiser. In the NRAN of FIG. 9, the first UWB device 901 may perform the NB procedure.

Referring to FIG. 9, the first UWB device 901 may transmit a discovery beacon (message), and a second UWB device 902 and/or a third UWB device 903 may receive a discovery beacon (message). The first UWB device 901 may broadcast a discovery beacon (message) through at least one discovery channel using the NB antenna of the first UWB device 601, and the second UWB device 902 and/or the third UWB device 903 may receive a discovery beacon (message) by scanning at least one discovery channel using its own NB antenna. Each device's NB antenna may be connected to each device's NB transceiver. The NB transceiver may support at least one discovery channel.

In FIG. 9, the first UWB device 901 may keep the NB transceiver (or NB antenna) in the active state (on) for transmission of a discovery beacon (message). Unlike the embodiment of FIG. 6, in FIG. 9, the first UWB device 901 need not activate the UWB transceiver (or UWB antenna) to transmit a discovery beacon (message). For example, even when the UWB transceiver (or UWB antenna) of the first UWB device 901 is maintained in the inactive state, the first UWB device 901 may transmit a discovery beacon (message). In this case, unlike the embodiment of FIG. 6, device discovery is possible even in a state in which the UWB communication function is deactivated.

Further, the second UWB device 902 and third UWB device 903 keep the NB transceiver (or NB antenna) in the active state (on) to receive the discovery beacon (message) but, since UWB communication (e.g., UWB ranging) has not been performed yet, may keep the UWB transceiver (or UWB antenna) in the inactive state (off).

Thereafter, the first UWB device 901, the second UWB device 902, and/or the third UWB device 903 may activate the UWB transceiver (or UWB antenna) to perform UWB communication with another UWB device.

For example, upon obtaining information necessary to participate in the UWB ranging (UWB procedure) with the first UWB device 901 through the above-described NB procedure, the third UWB device 903 may switch the UWB transceiver (or UWB antenna) of the third UWB device 903 to the active state (on) to perform UWB ranging with the first UWB device 901. Thereafter, the third UWB device 902 may perform UWB ranging with the first UWB device 901 through the UWB antenna. As described above, the UWB antenna may be connected to the UWB transceiver, and the UWB transceiver may support at least one UWB channel.

Meanwhile, when the third UWB device 903 performs UWB ranging with the first UWB device 901, the third UWB device 903 may switch the NB transceiver (or NB antenna) of the third UWB device 903 to the inactive state (off) to save power consumption.

As such, the UWB transceiver (or UWB antenna) and/or NB transceiver (or NB antenna) may be turned on/off depending on the context, thereby saving power consumption.

Figure 10:
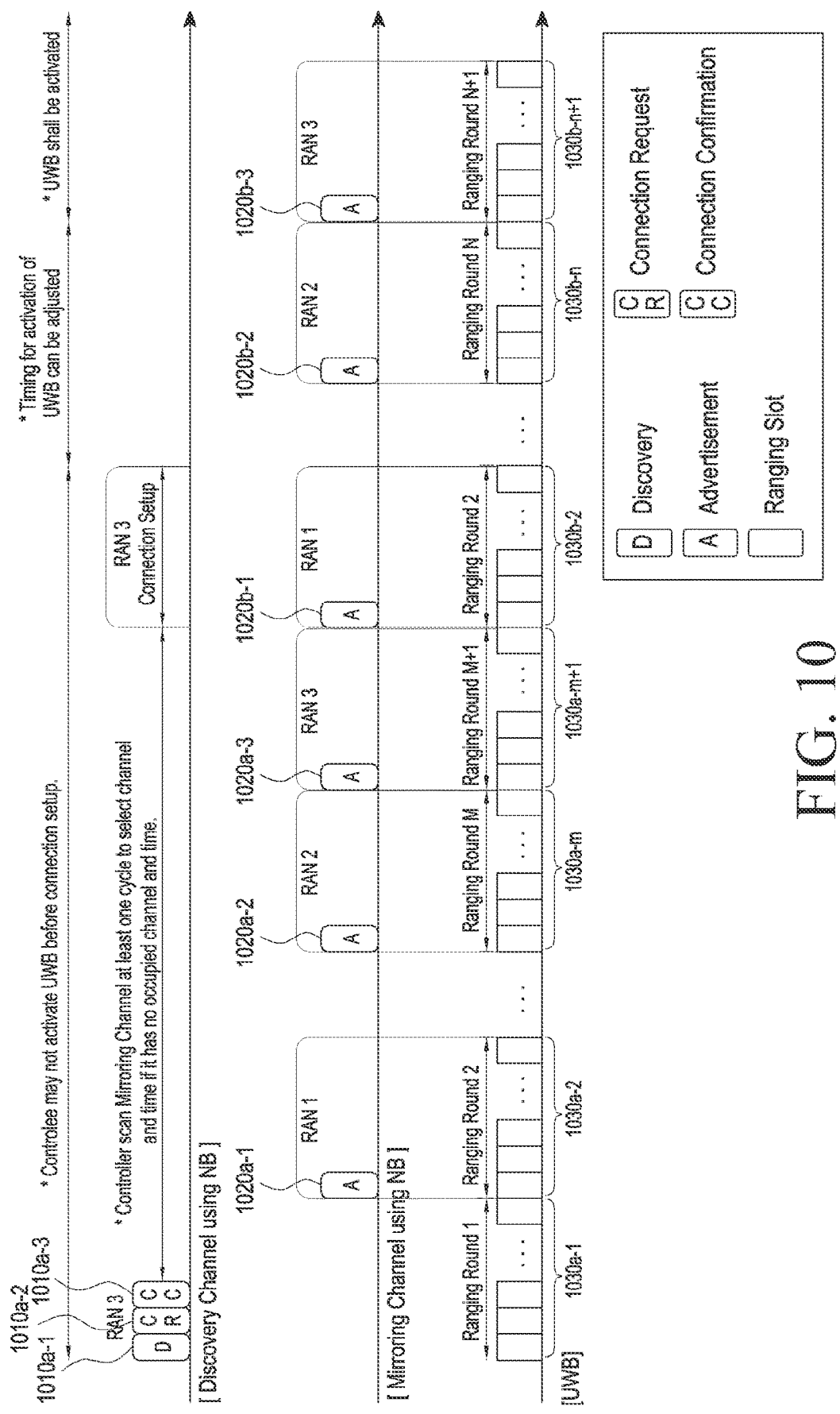
FIG. 10 illustrates a structure of a channel used in a ranging area network, according to another embodiment.

FIG. 10 illustrates a structure of a channel used in a ranging area network according to another embodiment.

In FIG. 10, a ranging block structure may be configured for the UWB channel. For example, as shown, a first ranging block and a second ranging block may be configured for the UWB channel, the first ranging block including a plurality of ranging rounds having ranging round 1 1030a-1, ranging round 2 1030a-2, . . . , ranging round M 1030a-,m, ranging round M+1 1030a-m+1, and the second ranging block including a plurality of ranging rounds having ranging round 1, ranging round 2 1030b-2, ranging round N 1030b-n, . . . , ranging round N+1 1030b-,m+1. M and N may be the same or different numbers. Each ranging round includes at least one ranging slot.

In FIG. 10, at least one advertisement message may be transferred via the mirroring channel using NB. For example, as shown, each advertisement message 1020a-1, 1020a-2, 1020a-3, 1020b-1, 1020b-3 may be transferred in a corresponding timing via the mirroring channel using NB.

In FIG. 10, at least one discovery message may be transferred via the discovery channel using NB. For example, as shown, discovery message 1010a-1 may be transferred in a corresponding timing via the discovery channel using NB.

In FIG. 10, at least one connection setup related message may be transferred via the discovery channel using NB. For example, as shown, connection request message 1010a-2 and connection confirmation message 1010a-3 may be transferred in a corresponding timing via the discovery channel using NB.

In FIG. 10, it is assumed that a plurality of ranging area networks (RANs) (e.g., RAN1, RAN2, and RAN3) exist. Each RAN of FIG. 10 may correspond to the RAN of FIG. 9.

In FIG. 10, it is assumed that one UWB channel is shared by the plurality of RANs. For example, as shown, the UWB channel may be shared by RAN1, RAN2 and RAN3.

Further, in FIG. 10, it is assumed that a UWB channel (e.g., at least one ranging round of the UWB channel) is previously occupied for some RANs sharing the corresponding UWB channel. For example, as shown, ranging round 2 1030a-2 of the first ranging block and ranging round 2 1030b-2 of the second ranging block may be occupied for RAN1. Ranging round M 1030a-m of the first ranging block and ranging round N 1030b-n of the second ranging block may be occupied for RAN2. M and N may be the same or different numbers. The index of the ranging round occupied by the same RAN may be the same or different for each ranging block.

The UWB channel (e.g., at least one ranging round of the UWB channel) may not be pre-occupied for RAN3. Accordingly, a discovery procedure and connection setup procedure for RAN3 need to be performed through a discovery channel.

With reference to FIG. 10, described below is an operation of a RAN previously occupying the UWB channel, followed by an operation of a RAN that does not pre-occupy the UWB channel.

(1) Operation of RAN With UWB Channel and Time Pre-Occupied (e.g., Operations of RAN1 and RAN2) (Operation of the Embodiment Described Above With Reference to FIGS. 6 to 8)

The UWB channel and at least one specific round of the UWB channel may be pre-occupied by the controller of RAN1 and the controller of RAN2. The configuration of the ranging block, ranging round, and ranging slot transmitted through the UWB channel may be set by the controller of RAN1 or the controller of RAN2.

The advertiser of the corresponding RAN may transmit the advertisement message through the mirroring channel coupled (or synchronized) with the UWB channel for the corresponding RAN. For example, the advertiser of RAN1 may transmit the advertisement message 1020a-1 or 1020b-1 through the mirroring channel at a specific time of the ranging round 1030a-2 or 1030b-2 of the UWB channel for RAN1 (e.g., the start time of the first slot of the corresponding ranging round or the time when a transmission offset is applied in the first slot of the corresponding ranging round). As another example, the advertiser of RAN2 may transmit the advertisement message 1020a-2 or 1020b-2 through the mirroring channel at a specific time of the ranging round 1030a-m or 1030b-n of the UWB channel for RAN2 (e.g., the start time of the first slot of the corresponding ranging round or the time when a transmission offset is applied in the first slot of the corresponding ranging round).

The scanner of the corresponding RAN may receive the advertisement message by scanning the mirroring channel. Thereafter, the scanner of the corresponding RAN may perform an operation based on the received advertisement message. The operation based on the advertisement message is described above with reference to FIGS. 6 to 8.

(2) Operation of RAN Without UWB Channel and Time Pre-Occupied (e.g., Operation of RAN3)

At a current time, the UWB channel and at least one specific round of the UWB channel are in a state not pre-occupied by the controller of RAN3. Therefore, the advertiser of RAN3 may not transmit an advisement message for discovery through the mirroring channel.

The advertiser of RAN3 may transmit a discovery beacon (message) 1010a-1 for discovery through the discovery channel. As an embodiment, the advertiser of RAN3 may be a controller or a controlee.

The UWB device (e.g., controlee) that has received the discovery beacon may transmit the connection request message 1010a-2 to the UWB device (e.g., the controller) that has transmitted the discovery beacon. Further, the UWB device (e.g., the controller) that has received the connection request message 1010a-2 may transmit a connection confirmation message 1010a-3 to the UWB device (e.g., controlee) that has transmitted the connection request message 1010a-2.

The discovery beacon (message), connection response message, and connection confirmation message may be transmitted in the period corresponding to one ranging round. For example, as shown, the discovery beacon (message) 1010a-1, connection response message 1010a-2, and/or connection confirmation message 1010a-3 for RAN3 may be transmitted during the period corresponding to the first ranging round 1030a-1 of the first ranging block.

As described above, the UWB channel is in a state not pre-occupied by the controller of RAN3. In this case, the controller of RAN3 may scan the mirroring channel in at least one cycle to select the UWB channel and time. The controller may identify the status of the UWB channel through the mirroring channel scanning and, based thereupon, select and occupy the UWB channel/time to be used. For example, as shown, the controller may identify the status of the UWB channel through mirroring channel scanning and may select and occupy the non-occupied ranging round 1030*a-m* 1 or 1030*b-n*+1 for other RANs of the corresponding UWB channel.

After the UWB channel and time are occupied by the controller of RAN3, a connection setup procedure for RAN3 may be performed. The controller may transmit information for communication in the newly occupied UWB channel to the controlee through the connection setup process. The controller may provide information for communication on the UWB channel to the controlee through a connection confirmation message. For example, the controller may receive a connection request message from the controlee through the discovery channel and may provide information for communication on the UWB channel to the controlee through the connection confirmation message corresponding to the connection request message through the discovery channel. As an embodiment, the connection confirmation message may include information about the UWB channel and/or ranging round (or start time of UWB communication) to be used. For example, the connection confirmation message may include information indicating that UWB communication may be performed in the ranging round N+1 (1030*b-n*+1) occupied for RAN3.

In this case, the controlee may participate in the corresponding ranging round of the corresponding UWB channel based on the connection confirmation message. Thus, the controller and the controlee may perform UWB communication (e.g., UWB ranging) in the corresponding UWB channel.

The controlee may not activate the UWB communication function prior to the connection setup procedure. The controlee may activate the UWB communication function when obtaining information for communication on the UWB channel through the connection setup procedure. In this case, the controlee may adjust the timing for activating the UWB communication function. For example, the controlee may activate the UWB communication function at the time (first time) of obtaining information for communication on the UWB channel through the connection setup procedure, activate the UWB communication function at the time (second time) of performing actual UWB communication, or activate the UWB communication function at a time (third time) between the first time and the second time.

As described above, when the discovery channel is used, discovery and connection setup may be performed on the same channel that is not coupled to the UWB channel. Accordingly, it is possible to minimize collision when occupying the UWB channel.

Figure 11A:
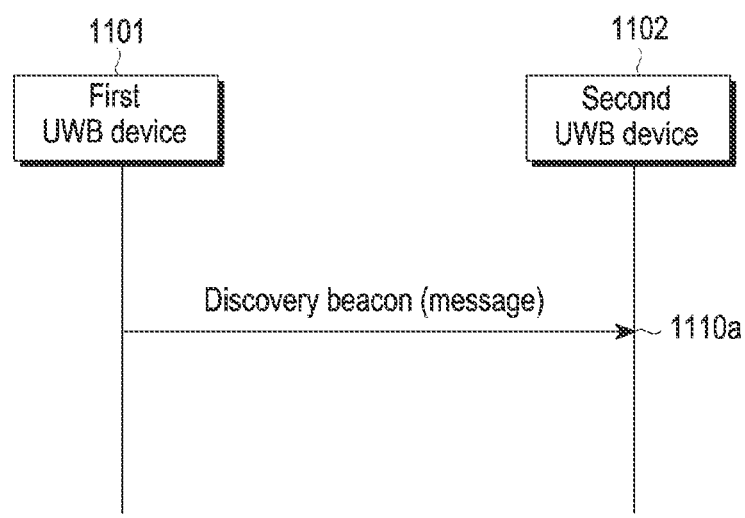
FIG. 11A illustrates a method for performing a discovery operation by a UWB device, according to an embodiment.

FIG. 11A illustrates a method for performing a discovery operation by a UWB device, according to an embodiment.

The discovery operation of FIG. 11A may be an example of the discovery operation of the NB procedure 210 of FIG. 2. The discovery operation of FIG. 11A may be performed through at least one discovery channel.

In FIG. 11A, a first UWB device 1101 may be a UWB device serving as an advertiser, and a second UWB device 1101 may be a UWB device serving as a scanner. Further, the first UWB device 1101 and the second UWB device 1101 may be a controller or a controlee.

Referring to FIG. 11A, in operation 1110*a*, the first UWB device 1101 may transmit a discovery beacon (message). The first UWB device 1101 may broadcast a discovery beacon (message) through at least one discovery channel. In this case, the second UWB device 1102 may scan the discovery channel to receive the discovery beacon (message). Thus, the second UWB device 1102 may discover the first UWB device 1101.

The first UWB device 1101 may transmit a discovery beacon (message) through the discovery channel regardless of whether the UWB channel is occupied.

The discovery beacon (message) may provide information used for device discovery.

The discovery channel may be a public channel (public discovery channel) that all UWB devices scan. In another embodiment, the discovery channel may be a private channel (private discovery channel) established through negotiation between devices.

The discovery beacon (message) may be transmitted periodically. In this case, information about the corresponding period may be included in the discovery beacon (message).

For the above-described transmission/reception of the discovery beacon (message) and a device discovery operation based thereon, refer to, for example, a known BLE advertising-related operation.

Figure 11B:
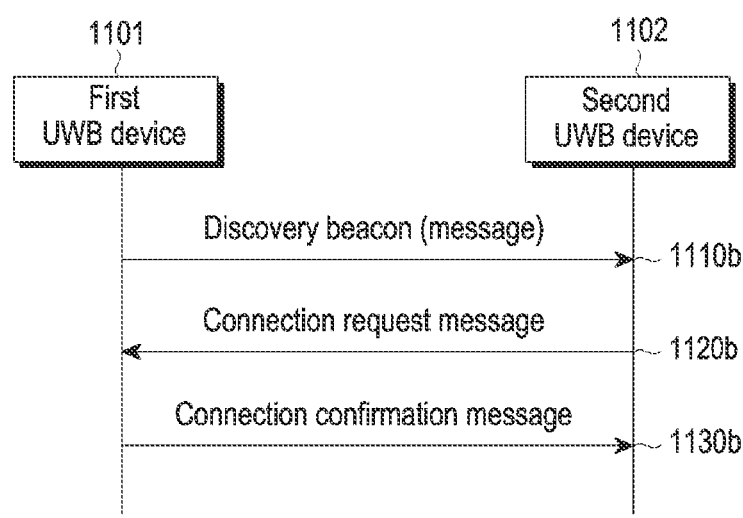
FIG. 11B illustrates a method for performing a discovery operation and a connection setup operation by a UWB device, according to an embodiment.

FIG. 11B illustrates a method for performing a discovery operation and a connection setup operation by a UWB device, according to an embodiment.

The discovery operation of FIG. 11B may be an example of the discovery operation of the NB procedure 210 of FIG. 2. The connection setup operation may be an example of the second connection setup operation of the NB procedure 210 of FIG. 2. The advertising operation and the connection setup operation of FIG. 11B may be performed through at least one discovery channel.

In FIG. 11B, a first UWB device 1101 may be a UWB device serving as an advertiser, and a second UWB device 1101 may be a UWB device serving as a scanner. Further, the first UWB device 1101 and the second UWB device 1101 may be a controller or a controlee.

Referring to FIG. 11B, in operation 1110*b*, the first UWB device 1101 may transmit a discovery beacon (message). The first UWB device 1101 may broadcast a discovery beacon (message) through at least one discovery channel. In this case, the second UWB device 1102 may scan the discovery channel to receive the discovery beacon (message). Thus, the second UWB device 1102 may discover the first UWB device 1101.

The first UWB device 1101 may transmit a discovery beacon (message) through the discovery channel regardless of whether the UWB channel is occupied.

The discovery beacon (message) may provide information used for device discovery.

The discovery channel may be a public channel (public discovery channel) that all UWB devices scan. In another embodiment, the discovery channel may be a private channel (private discovery channel) established through negotiation between devices.

The discovery beacon (message) may be transmitted periodically. In this case, information about the corresponding period may be included in the discovery beacon (message).

In operation 1120*b*, the second UWB device 1102 receiving the discovery beacon (message) may transmit a connection request message for connection setup to the first UWB device 1101. The second UWB device 1102 may transmit a connection request message to the first UWB device 1101 through the discovery channel through which the discovery beacon (message) has been received.

In operation 1130*b*, the first UWB device 1101 receiving the connection request message may transmit a connection confirmation message corresponding to the connection request message to the second UWB device 1102. The first UWB device 1101 may transmit a connection confirmation message to the second UWB device 1102 through the corresponding discovery channel.

When there is a UWB channel occupied by the controller, the connection confirmation message may include information about the corresponding UWB channel and related parameters (e.g., the start time of UWB communication or occupied ranging round).

When there is no UWB channel occupied by the controller, the connection confirmation message may include information indicating that the mirroring channel needs to be scanned.

The message exchange operations of operations 1120*b* and 1130*b* for connection setup may be repeatedly performed as many times as necessary. For example, if additional message exchange is required after performing the message exchange of operations 1120*b* and 1130*b* once, the message exchange operations of operations 1120*b* and 1130*b* may be further performed as many times as necessary in the corresponding discovery channel. For example, if the connection confirmation message includes information indicating that the mirroring channel needs to be scanned, the connection setup procedure is not completed through the corresponding connection confirmation message. Therefore, additional message exchange is required for connection setup, and through the additional message exchange, information about the corresponding UWB channel newly occupied by the controller and related parameters (e.g., start time of UWB communication or occupied ranging round) may be transferred to the controlee.

Figure 12:
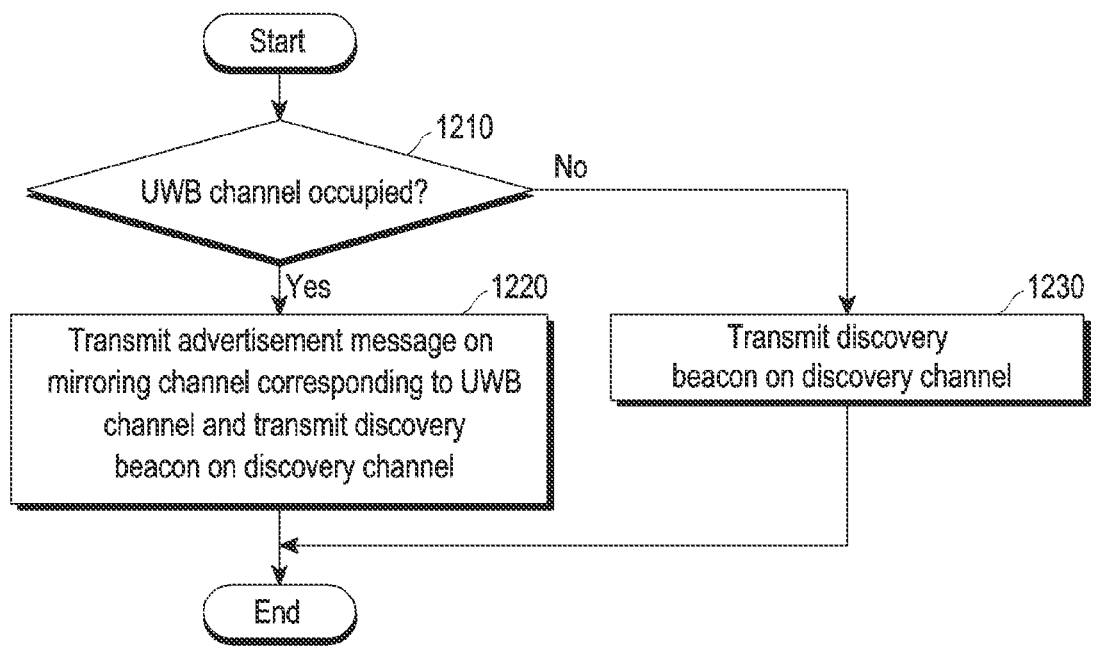
FIG. 12 is a flowchart illustrating a discovery operation by a controller, according to an embodiment.

FIG. 12 is a flowchart illustrating a discovery operation by a controller, according to an embodiment.

In FIG. 12, it is assumed that the message for discovery is transmitted by the controller. In FIG. 12, the controller may be denoted as a first UWB device, and the controlee may be denoted as a second UWB device.

FIG. 12 may be an example of the embodiment of FIG. 11A.

Referring to FIG. 12, the controller determines whether there is an occupied UWB channel, at 1210. The controller may identify whether there is an occupied UWB channel for the RAN to which the controller belongs.

If there is an occupied UWB channel, the controller transmits an advertisement message through the mirroring channel corresponding to the UWB channel, and transmits a discovery beacon (message) through the discovery channel, at 1220.

The advertisement message may include information indicating the status (state) of the UWB channel.

When the advertisement message is transmitted through the mirroring channel, another controller or controlee may receive the advertisement message through the mirroring channel to identify the UWB channel status and access the indicated channel/time.

When the discovery beacon is transmitted through the discovery channel, another controller or controlee may receive the discovery beacon through the discovery channel and discover the controller that has transmitted the discovery beacon.

The discovery channel may be a public channel that all UWB devices scan. In another embodiment, the discovery channel may be a private channel established through negotiation between devices.

The discovery beacon (message) may be transmitted periodically. In this case, information about the corresponding period may be included in the discovery beacon (message).

If there is no occupied UWB channel, the controller transmits a discovery beacon through the discovery channel, at 1230. Unlike the mirroring channel, which is coupled to the UWB channel, the discovery channel is not coupled to the UWB channel, so that the controller may send a message (e.g., discovery beacon (message)) for discovery through the discovery channel regardless of whether the UWB channel is occupied.

Since the mirroring channel is coupled with the UWB channel, if the UWB channel is not occupied, and the controller sends a message for discovery (e.g., an advertisement message) through the mirroring channel, 1) the channel congestion increases, and 2) whether the channel is occupied may not be identified through a simple method, such as energy detection. Therefore, if the UWB channel is not occupied, the controller should not transmit an advertisement message through the mirroring channel.

Figure 13:
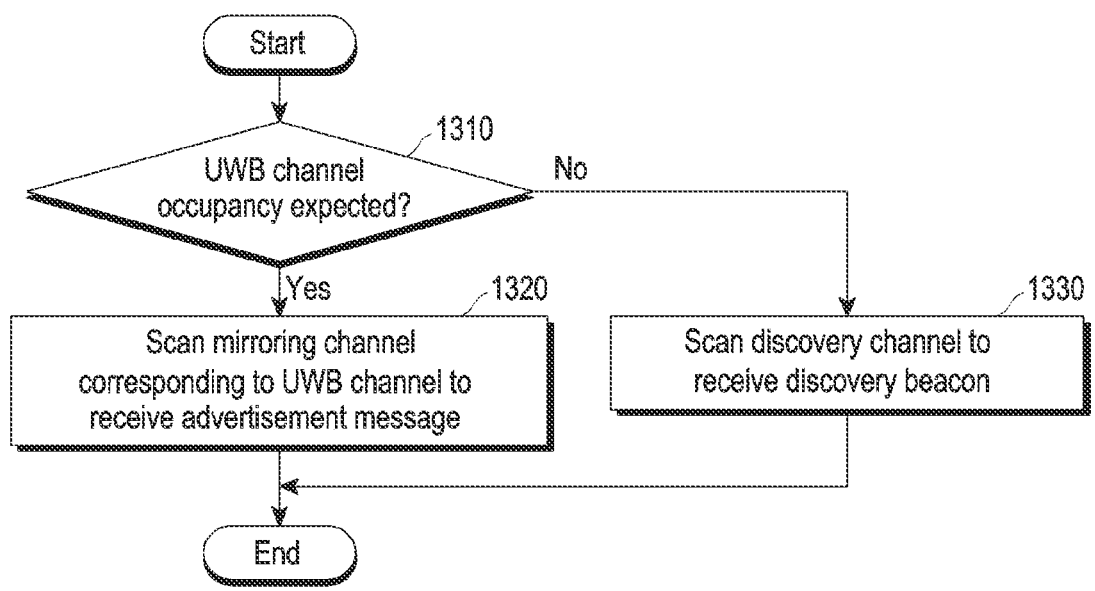
FIG. 13 is a flowchart illustrating a discovery operation by a controlee, according to an embodiment.

FIG. 13 is a flowchart illustrating a discovery operation by a controlee, according to an embodiment.

In FIG. 13, it is assumed that the message for discovery is transmitted by the controlee. The controlee may receive a message/beacon for discovery through the NB channel without UWB activation. In FIG. 13, the controller may be denoted as a first UWB device, and the controlee may be denoted as a second UWB device.

FIG. 13 may be an example of the embodiment of FIG. 11A.

Referring to FIG. 13, the controlee determines whether UWB channel occupancy is expected, 1310. The controlee may identify whether the controller is expected to occupy the UWB channel.

When the UWB channel occupancy is expected, the controlee scans the mirroring channel corresponding to the UWB channel to receive the advertisement message, at 1320. Thus, the controlee may discover the controller.

For example, in the use case of the kiosk, the kiosk device (controller) may not know when and how many UEs (controlees) access and may thus occupy the UWB channel always at regular periods to be competitively accessed by the UEs. In this case, the kiosk device may transmit an advertisement message for informing the occupancy status of the UWB channel through the mirroring channel coupled to the UWB channel at regular periods. In this case, the UE may expect the kiosk device to occupy the UWB channel and scan the mirroring channel to receive the advertisement message.

As another example, in the use case of the kiosk, the UE (controlee) may activate a specific application to access the kiosk device (controller). When the specific application is activated, the UE may expect that the kiosk device, which is the controller, occupies the UWB channel and scan the mirroring channel to receive the advertisement message, thereby performing service discovery quickly.

When the UWB channel occupancy is not expected, the controlee scans the discovery channel and receive a discovery beacon (message), 1330. Thus, the controlee may discover the controller.

As in the kiosk example described above, when the controller always occupies the UWB channel, power consumption increases. Accordingly, when the UWB channel occupancy is unnecessary, the controller needs to de-activate the UWB communication function. In this case, the controller cannot transmit a message for discovery through the mirroring channel but may only transmit a message for discovery through the discovery channel. Therefore, when the UWB channel occupancy is not expected, the controlee may perform the discovery operation through discovery channel scanning instead of mirroring channel scanning.

The controlee may scan the public discovery channel to receive a plurality of discovery beacons and discover a plurality of controllers.

In another embodiment, the controlee may scan the private discovery channel set through previous negotiation with the controller to receive the discovery beacon from a specific controller and discover the specific controller.

Figure 14:
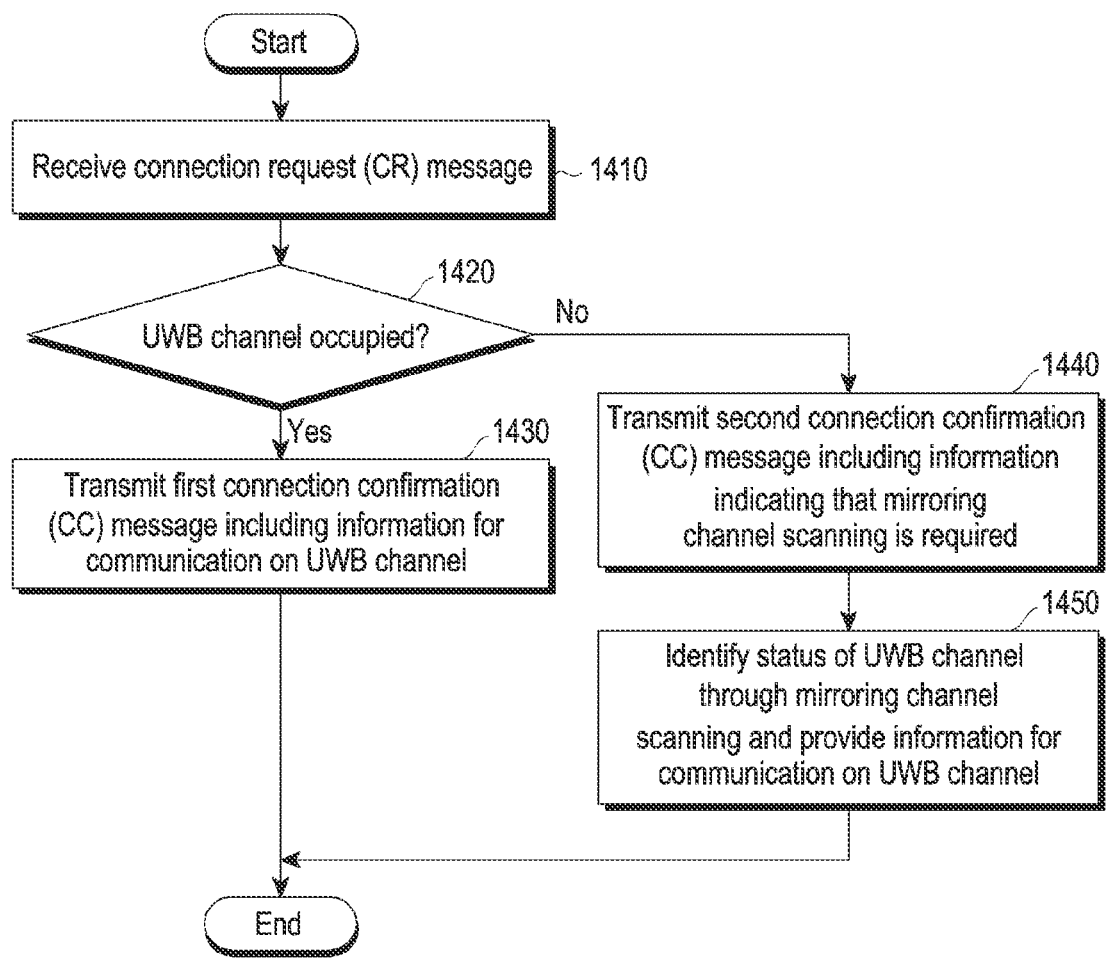
FIG. 14 is a flowchart illustrating a connection setup operation by a controller, according to an embodiment.

FIG. 14 is a flowchart illustrating a connection setup operation by a controller, according to an embodiment.

In FIG. 14, it is assumed that the connection request message is transmitted by the controlee, and the connection confirmation message is transmitted by the controller. In FIG. 14, it is assumed that the connection request message and the connection confirmation message are transmitted/received through the discovery channel. In FIG. 14, the controller may be denoted as a first UWB device, and the controlee may be denoted as a second UWB device.

FIG. 14 may be an example of the embodiment of FIG. 11B.

Referring to FIG. 14, the controller receives the connection request message from the controlee through the discovery channel, at 1410. The controlee that has transmitted the connection request message may be the controlee that has received a message for discovery (e.g., a discovery beacon) from the controller through the discovery channel.

The controller determines whether there is a pre-occupied UWB channel, at 1420.

If there is an occupied UWB channel, the controller transmits a first connection confirmation message including information for communication in the corresponding UWB channel to the controlee through the discovery channel, at 1430. This is described in greater detail below with reference to FIG. 16.

If there is no occupied UWB channel, the controller transmits a second connection confirmation message including information indicating that mirroring channel scanning is required to the controlee through the discovery channel, at 1440. In this case, since connection setup is not completed through the second connection confirmation message, an additional procedure for connection setup may be subsequently performed.

Further, the controller may identify the status (state) of the UWB channel through mirroring channel scanning and may provide information for communication on the UWB channel to the controlee, at 1450. The information for communication on the UWB channel may include information about the time (e.g., ranging round) and UWB channel to be used.

The controller may identify the status of the UWB channel through the mirroring channel scanning and, based thereupon, select and occupy the UWB channel/time to be used.

The controller may provide information for communication on the UWB channel to the controlee through a third connection confirmation message. For example, the controller may receive a second connection request message from the controlee through the discovery channel in the connection setup procedure additionally performed and may provide information for communication on the UWB channel to the controlee through the discovery channel using the third connection confirmation message corresponding to the second connection request message. This is described in greater detail below with reference to FIG. 17.

Figure 15:
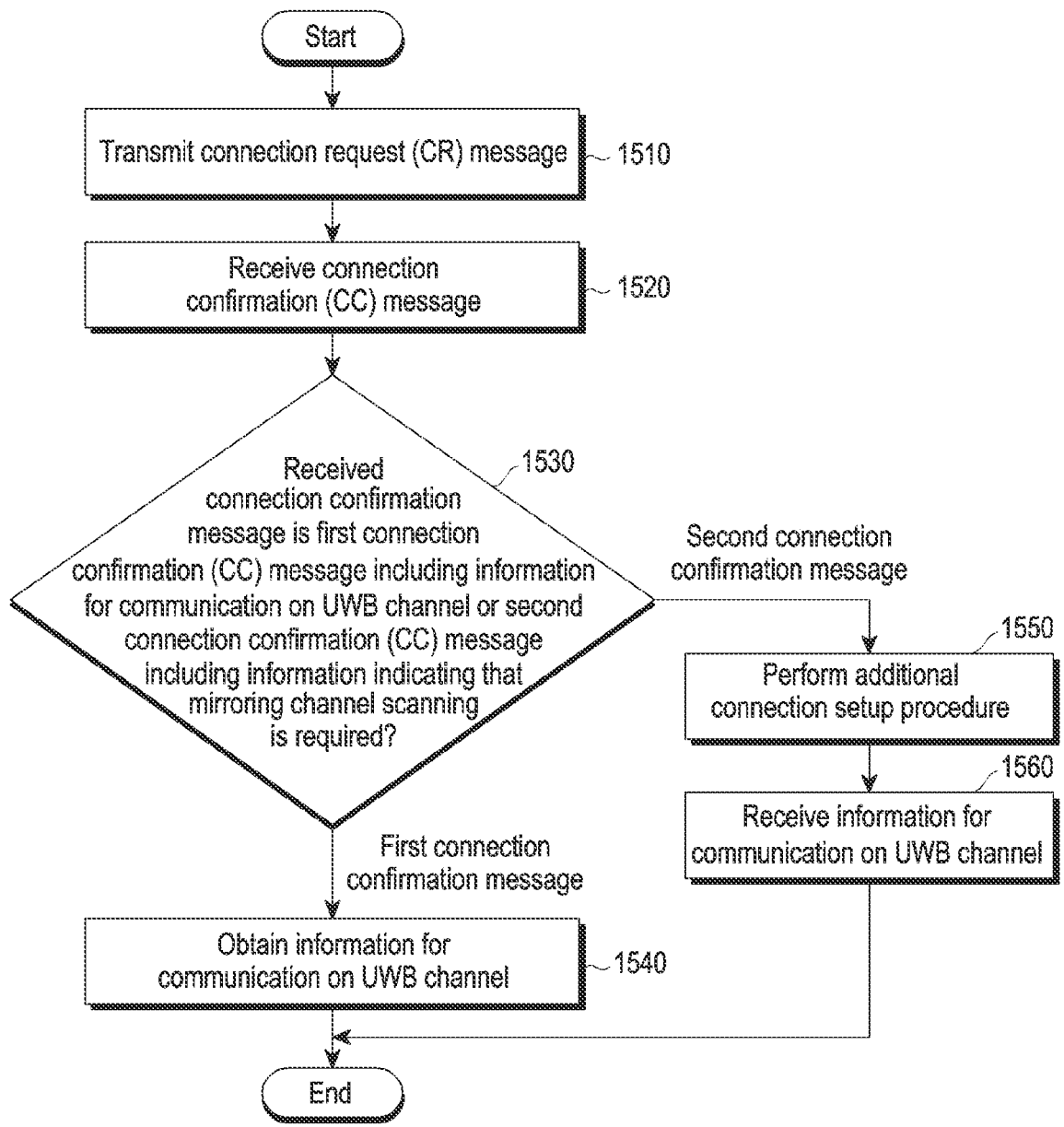
FIG. 15 is a flowchart illustrating a connection setup operation by a controlee, according to an embodiment.

FIG. 15 is a flowchart illustrating a connection setup operation by a controlee, according to an embodiment.

In FIG. 15, it is assumed that the connection request message is transmitted by the controlee, and the connection confirmation message is transmitted by the controller. In FIG. 15, it is assumed that the connection request message and the connection confirmation message are transmitted/received through the discovery channel. In FIG. 15, the controller may be denoted as a first UWB device, and the controlee may be denoted as a second UWB device.

FIG. 15 may be an example of the embodiment of FIG. 11B.

Referring to FIG. 15, the controlee transmits a connection request message to the controller through the discovery channel, at 1510. The controlee that has transmitted the connection request message may be the controlee that has received a message for discovery (e.g., a discovery beacon) from the controller through the discovery channel.

The controlee receives a connection confirmation message from the controller through the discovery channel, at 1520.

The controlee determines whether the received connection confirmation message is the first connection confirmation message including information for communication on the UWB channel or the second connection confirmation message including information indicating that mirroring channel scanning is required, at 1530.

When the received connection confirmation message is the first connection confirmation message, the controlee obtains information for communication on the UWB channel, at 1540. The information for communication on the UWB channel may include information about the time (e.g., ranging round) and UWB channel to be used. The controlee may participate in the corresponding UWB channel and the corresponding ranging round based on the information. Thus, the controlee and the controller may perform UWB communication (e.g., UWB ranging) in the corresponding UWB channel.

When the received connection confirmation message is the second connection confirmation message, the controlee performs an additional connection setup procedure, at 1550. In this case, the controlee may transmit the second connection request message to the controller through the discovery channel, and the controller may transmit the third connection confirmation message corresponding to the second connection request message to the controlee through the discovery channel. The third connection confirmation message may include information for communication on the UWB channel.

The controlee receives information for communication on the UWB channel, at 1560. The controlee may receive information for communication on the UWB channel through the above-described third connection confirmation message. The information for communication on the UWB channel may include information about the time (e.g., start time of UWB communication or occupied ranging round) and UWB channel to be used. The controlee may participate in the corresponding UWB channel and the corresponding ranging round based on the information. Thus, the controlee and the controller may perform UWB communication (e.g., UWB ranging) in the corresponding UWB channel.

Figure 16:
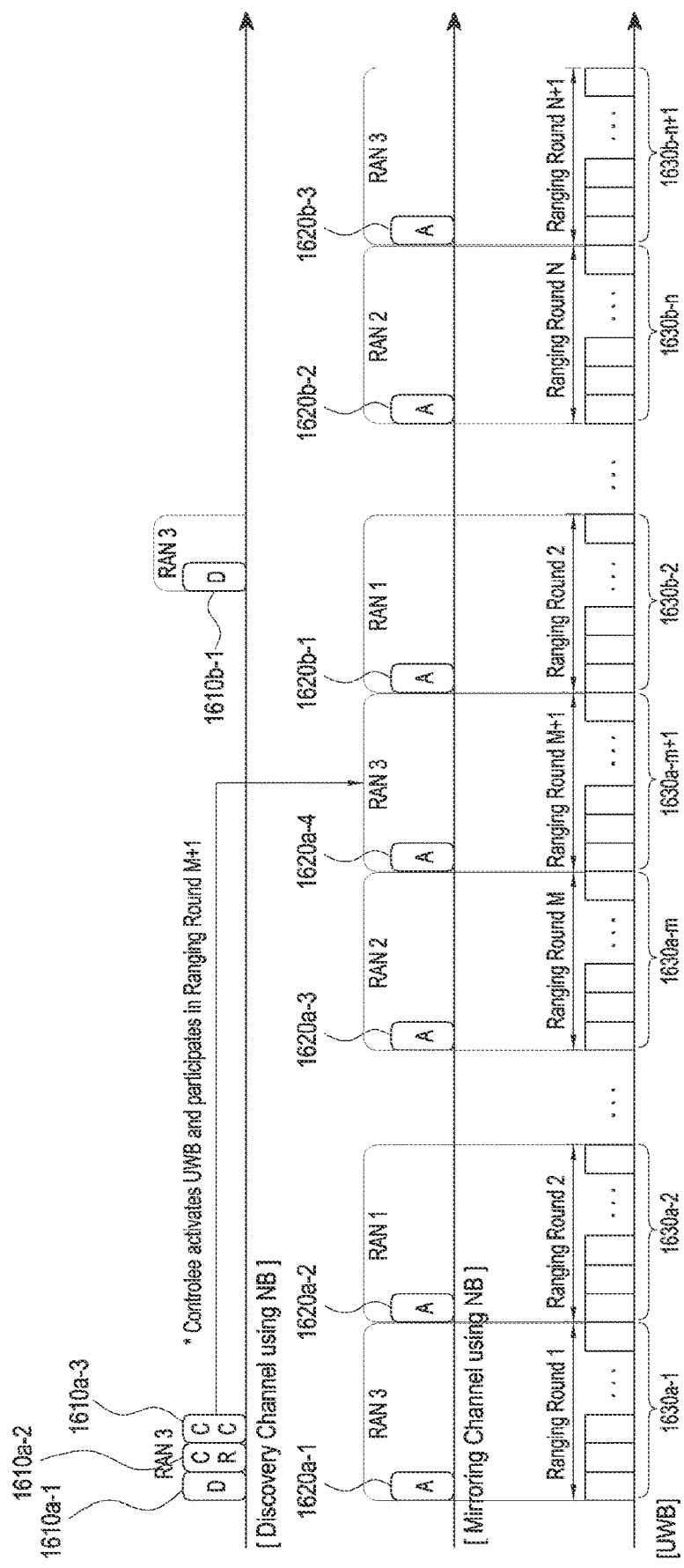
FIG. 16 illustrates a structure of a channel used in a ranging area network, according to another embodiment.

FIG. 16 illustrates a structure of a channel used in a ranging area network, according to another embodiment.

In FIG. 16, a ranging block structure may be configured for the UWB channel. For example, as shown, a first ranging block and a second ranging block may be configured for the UWB channel, the first ranging block including a plurality of ranging rounds having ranging round 1 1630a-1, ranging round 2 1630a-2, . . . , ranging round M 1630a-,m, ranging round M+1 1630a-m+1, and the second ranging block including a plurality of ranging rounds having ranging round 1, ranging round 2 1630b-2, ranging round N 1630b-n, . . . , ranging round N+1 1630b-,m+1. M and N may be the same or different numbers. Each ranging round includes at least one ranging slot.

In FIG. 16, at least one advertisement message may be transferred via the mirroring channel using NB. For example, as shown, each advertisement message 1620a-1, 1620a-2, 1620a-3, 1620a-4, 1620b-1, 1620b-3, 1620b-3 may be transferred in a corresponding timing via the mirroring channel using NB.

In FIG. 16, at least one discovery message may be transferred via the discovery channel using NB. For example, as shown, each discovery message 1610a-1, 1601b-1 may be transferred in a corresponding timing via the discovery channel using NB.

In FIG. 16, at least one connection setup related message may be transferred via the discovery channel using NB. For example, as shown, connection request message 1610a-2 and connection confirmation message 1610a-3 may be transferred in a corresponding timing via the discovery channel using NB.

In FIG. 16, it is assumed that one UWB channel is shared by the plurality of RANs. For example, as shown, the UWB channel may be shared by RAN1, RAN2 and RAN3.

Further, in FIG. 16, it is assumed that each of at least one ranging round of the UWB channel is previously occupied for each RAN sharing the corresponding UWB channel. For example, as shown, ranging round 1 1630a-1 and ranging round M+1 1630a-m+1 of the first ranging block and ranging round N+1 1630b-n+1 of the second ranging block may be occupied for RAN3, ranging round 2 1630a-2 of the first ranging block and ranging round 2 1630b-2 of the second ranging block may be occupied for RAN1, and ranging round M 1630a-m of the first ranging block and ranging round N 1630b-n of the second ranging block may be occupied for RAN2. M and N may be the same or different numbers. The index of the ranging round occupied by the same RAN may be the same or different for each ranging block.

The advertiser of the corresponding RAN may transmit the advertisement message through the mirroring channel coupled (or synchronized) with the UWB channel for the corresponding RAN. For example, as shown, the advertiser of RAN1 may transmit the advertisement message 1620a-1 or 1620b-1 through the mirroring channel at a specific time of the ranging round 1630a-2 or 1630b-2 of the UWB channel for RAN1 (e.g., the start time of the first slot of the corresponding ranging round or the time when a transmission offset is applied in the first slot of the corresponding ranging round). As another example, as shown, the advertiser of RAN2 may transmit the advertisement message 1620a-2 or 1620b-2 through the mirroring channel at a specific time of the ranging round 1630a-m or 1630b-n of the UWB channel for RAN2 (e.g., the start time of the first slot of the corresponding ranging round or the time when a transmission offset is applied in the first slot of the corresponding ranging round). As another example, as shown, the advertiser of RAN3 may transmit the advertisement message 1620a-1, 1620a-4, or 1620b-3 through the mirroring channel at a specific time of the ranging round 1630a-1, 1630a-m+1, or 1630b-n+1 of the UWB channel for RAN3 (e.g., the start time of the first slot of the corresponding ranging round or the time when a transmission offset is applied in the first slot of the corresponding ranging round).

The advertiser of the corresponding RAN may transmit a discovery beacon (message) through the discovery channel that is not coupled (or not synchronized) with the UWB channel for the corresponding RAN. For example, as shown, the advertiser of RAN3 may periodically or aperiodically transmit the discovery beacons 1610a-1 and 1610b-1 through the discovery channel.

The UWB device (e.g., controlee) that has received the discovery beacon may transmit the connection request message 1610a-2 to the UWB device (e.g., the controller) that has transmitted the discovery beacon. Further, the UWB device (e.g., the controller) that has received the connection request message 1610a-2 may transmit a connection confirmation message 1610a-3 to the UWB device (e.g., controlee) that has transmitted the connection request message 1610a-2. In the embodiment of FIG. 16, since the UWB channel is already occupied by the controller, the connection confirmation message 1610a-3 may include information for communication on the UWB channel. For example, the connection confirmation message 1610a-3 may include information about the UWB channel and/or ranging round (or start time of UWB communication) to be used. For example, as shown, the connection confirmation message 1610a-3 may include information informing that UWB communication may be performed in the ranging round M+1 1630a-m+1 occupied for RAN3. In this case, the controlee may participate in the corresponding ranging round of the corresponding UWB channel based on the connection confirmation message 1610a-3. Thus, the controller and the controlee may perform UWB communication (e.g., UWB ranging) in the corresponding UWB channel.

Figure 17:
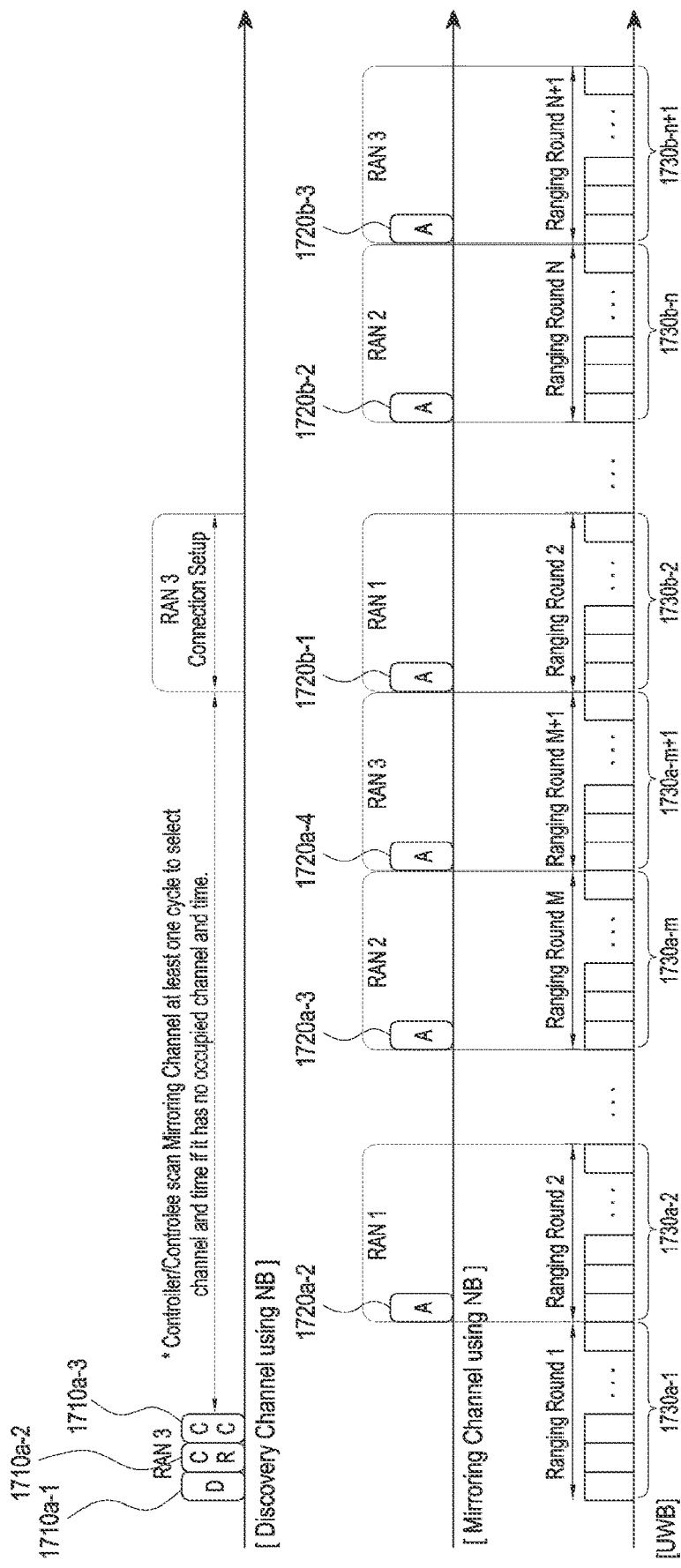
FIG. 17 illustrates a structure of a channel used in a ranging area network, according to another embodiment.

FIG. 17 illustrates a structure of a channel used in a ranging area network, according to another embodiment.

In FIG. 17, a ranging block structure may be configured for the UWB channel. For example, as shown, a first ranging block and a second ranging block may be configured for the UWB channel, the first ranging block including a plurality of ranging rounds having ranging round 1 1730a-1, ranging round 2 1730a-2, . . . , ranging round M 1730a-, m, ranging round M+1 1730a-m+1, and the second ranging block including a plurality of ranging rounds having ranging round 1, ranging round 2 1730b-2, ranging round N 1730b-n, . . . , ranging round N+1 1730b-m+1. M and N may be the same or different numbers. Each ranging round includes at least one ranging slot.

In FIG. 17, at least one advertisement message may be transferred via the mirroring channel using NB. For example, as shown, each advertisement message 1720a-2, 1720a-3, 1720a-4, 1720b-1, 1720b-3, 1720b-3 may be transferred in a corresponding timing via the mirroring channel using NB.

In FIG. 17, at least one discovery message may be transferred via the discovery channel using NB. For example, as shown, discovery message 1710a-1 may be transferred in a corresponding timing via the discovery channel using NB.

In FIG. 17, at least one connection setup related message may be transferred via the discovery channel using NB. For example, as shown, connection request message 1710a-2 and connection confirmation message 1710a-3 may be transferred in a corresponding timing via the discovery channel using NB.

In FIG. 17, it is assumed that one UWB channel is shared by the plurality of RANs. For example, as shown, the UWB channel may be shared by RAN1, RAN2 and RAN3.

Further, in FIG. 17, it is assumed that at least one ranging round of the UWB channel is previously occupied for some RAN sharing the corresponding UWB channel. For example, as shown, ranging round 2 1730a-2 of the first ranging block and ranging round 2 1730b-2 of the second ranging block may be occupied for RAN1. Ranging round M 1730a-m of the first ranging block and ranging round N 1730b-m of the second ranging block may be occupied for RAN2. At least one ranging round of the UWB channel may not be pre-occupied for RAN3. M and N may be the same or different numbers. The index of the ranging round occupied by the same RAN may be the same or different for each ranging block.

The advertiser of the corresponding RAN may transmit the advertisement message through the mirroring channel coupled (or synchronized) with the UWB channel for the corresponding RAN. For example, as shown, the advertiser of RAN1 may transmit the advertisement message 1720a-1 or 1720b-1 through the mirroring channel at a specific time of the ranging round 1730a-2 or 1730b-2 of the UWB channel for RAN1 (e.g., the start time of the first slot of the corresponding ranging round or the time when a transmission offset is applied in the first slot of the corresponding ranging round). As another example, as shown, the advertiser of RAN2 may transmit the advertisement message 1720a-2 or 1720b-2 through the mirroring channel at a specific time of the ranging round 1730a-m or 1730b-n of the UWB channel for RAN2 (e.g., the start time of the first slot of the corresponding ranging round or the time when a transmission offset is applied in the first slot of the corresponding ranging round). Since there is no previously occupied ranging round for RAN3, the advertiser of RAN3 may not transmit the advertisement message through the mirroring channel at the current time.

The advertiser of the corresponding RAN may transmit a discovery beacon (message) through the discovery channel that is not coupled (or not synchronized) with the UWB channel for the corresponding RAN. For example, as shown, the advertiser of RAN3 may periodically or aperiodically transmit the discovery beacon 1710a-1 through the discovery channel.

The UWB device (e.g., controlee) that has received the discovery beacon may transmit the connection request message 1710a-2 to the UWB device (e.g., the controller) that has transmitted the discovery beacon. Further, the UWB device (e.g., the controller) that has received the connection request message 1710a-2 may transmit a connection confirmation message 1710a-3 to the UWB device (e.g., controlee) that has transmitted the connection request message 1710a-2.

In FIG. 17, since the UWB channel is not previously occupied by the controller of RAN3, the connection confirmation message may include information indicating that mirroring channel scanning is required. In this case, the controller may identify the status of the UWB channel through the mirroring channel scanning and, based thereupon, select and occupy the UWB channel/time to be used. For example, as shown, the controller may identify the status of the UWB channel through mirroring channel scanning and may select and occupy the non-occupied ranging round 1730a-m+1 or 1730b-n+1 for other RANs of the corresponding UWB channel.

The controller may transmit information for communication in the newly occupied UWB channel to the controlee through the connection setup procedure. For example, as shown, after the ranging round for RAN3 is occupied, an additional connection setup procedure may be performed. In this case, the controller may transmit information for communication in the newly occupied UWB channel to the controlee. The controller may provide information for communication on the UWB channel to the controlee through a connection confirmation message. For example, the controller may receive a connection request message from the controlee in the additional connection setup procedure and may provide information for communication on the UWB channel to the controlee through the connection confirmation message corresponding to the connection request message. The connection confirmation message may include information about the UWB channel and/or ranging round (or start time of UWB communication) to be used. For example, the connection confirmation message may include information indicating that UWB communication may be performed in the ranging round N+1 1730b-n+1 occupied for RAN3. In this case, the controlee may participate in the corresponding ranging round of the corresponding UWB channel based on the connection confirmation message. Thus, the controller and the controlee may perform UWB communication (e.g., UWB ranging) in the corresponding UWB channel.

Figure 18:
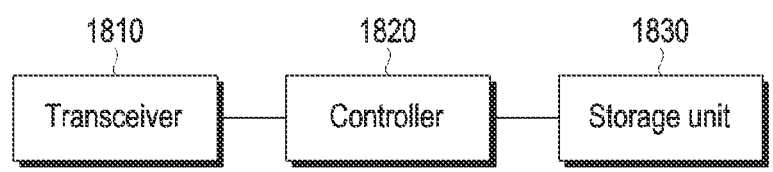
FIG. 18 illustrates a structure of a first UWB device, according to an embodiment.

FIG. 18 illustrates a structure of a first UWB device, according to an embodiment.

In FIG. 18, the first UWB device may correspond to the UWB device of FIG. 1, include a UWB device, or may be an electronic device that may include a portion of a UWB device.

In FIG. 18, the first UWB device may be a UWB device serving as a controller/advertiser or a controlee/advertiser.

Referring to FIG. 18, the first UWB device includes a transceiver 1810, a controller 1820, and a storage unit 1830. Herein, the controller 1820 may be defined as a circuit or application-specific integrated circuit or at least one processor.

The transceiver 1810 may transmit and receive signals to/from another entity. The transceiver 1810 may transmit/receive data to/from another device through, for example, at least one NB channel and/or at least one UWB channel.

The transceiver 1810 may include at least one first transceiver supporting the NB channel and at least one second transceiver supporting the UWB channel. In another embodiment, the transceiver 1820 may include at least one transceiver supporting both the NB channel and the UWB channel.

The controller 1820 may control the overall operation of the electronic device. For example, the controller 1820 may control inter-block signal flow to perform the operations according to the above-described flowchart. Specifically, the controller 1820 may control the operations of the first UWB device described above with reference to FIGS. 1 to 17.

For example, the controller 1820 may broadcast a discovery message providing information used for discovery of the first UWB device through an NB discovery channel.

As another example, when the UWB channel is occupied by the first UWB device, the controller 1820 may broadcast an advertisement message providing information about the occupied UWB channel through the NB mirroring channel associated with the UWB channel.

As another example, the controller 1820 may receive a connection request message for connection setup from the second UWB device through the NB discovery channel and may transmit a connection confirmation message corresponding to the connection request message to the second UWB device through the NB discovery channel.

As another example, the controller 1820 may scan the NB mirroring channel to identify the state of the UWB channel and select the UWB channel and time to be occupied by the first UWB device.

The storage unit 1830 may store at least one of information transmitted/received via the transceiver 1810 and information generated via the controller 1820. For example, the storage unit 1830 may store information and data (e.g., advertising information) necessary for the method described with reference to FIGS. 1 to 17.

Figure 19:
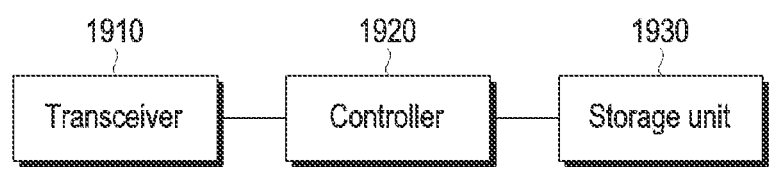
FIG. 19 illustrates a structure of a second UWB device, according to an embodiment.

FIG. 19 illustrates a structure of a second UWB device, according to an embodiment.

In FIG. 19, the first UWB device may correspond to the UWB device of FIG. 2, include a UWB device, or may be an electronic device that may include a portion of a UWB device.

In FIG. 19, the second UWB device may be a UWB device serving as a controller/scanner or a controlee/scanner.

Referring to FIG. 19, the second UWB device includes a transceiver 1910, a controller 1920, and a storage unit 1930. In the disclosure, the controller 1920 may be defined as a circuit or application-specific integrated circuit (ASIC) or at least one processor.

The transceiver 1910 may transmit and receive signals to/from another entity. The transceiver 1910 may transmit/ receive data to/from another device through, for example, at least one NB channel and/or at least one UWB channel.

The transceiver 1910 may include at least one first transceiver supporting the NB channel and at least one second transceiver supporting the UWB channel. In another embodiment, the transceiver 1920 may include at least one transceiver supporting both the NB channel and the UWB channel.

The controller 1920 may control the overall operation of the electronic device according to an embodiment. For example, the controller 1920 may control inter-block signal flow to perform the operations according to the above-described flowchart. Specifically, the controller 1920 may control the operations of the second UWB device described above with reference to FIGS. 1 to 17.

For example, the controller 1920 may receive, from the first UWB device, a discovery message providing information used for discovery of the first UWB device through a NB discovery channel.

As another example, when the UWB channel is expected to be occupied by the first UWB device, the controller 1920 may receive, from the first UWB device, an advertisement message providing information about the occupied UWB channel through the NB mirroring channel associated with the UWB channel.

As another example, the controller 1920 may transmit a connection request message for connection setup to the first UWB device through the NB discovery channel and may receive a connection confirmation message corresponding to the connection request message from the first UWB device through the NB discovery channel.

The storage unit 1930 may store at least one of information transmitted/received via the transceiver 1910 and information generated via the controller 1920. For example, the storage unit 1930 may store information and data (e.g., advertising information) necessary for the method described with reference to FIGS. 1 to 17.

Embodiments described below may be applied together with, in addition to, or instead of some of the embodiments described above with reference to FIGS. 1 to 19.

Operation of Multiple NB Channels and Channel Hopping

As described above, one NB channel or a plurality of NB channels may be operated/supported together. The NB channel may be a mirroring channel or a discovery channel.

Meanwhile, when only one NB channel is operated (case of single NB channel operation), failure in seamless communication may occur in some cases. For example, when a plurality of devices simultaneously use a single NB channel, seamless communication in the corresponding NB channel may not be achieved due to collision between signals of the plurality of devices. As another example, since the wireless communication environment of the single NB channel is not good, seamless communication in the corresponding NB channel may be impossible.

Therefore, if necessary, a plurality of NB channels need to be operated together. When a plurality of NB channels is operated, a channel hopping technique for performing communication while hopping (or moving) channels may be used for seamless communication.

When a plurality of NB channels is operated, and the channel hopping technique is used/applied, the UWB device may perform the channel hopping operation based on a preset hopping configuration (e.g., hopping sequence, hopping period, and the number of the multiple channels used in channel hopping). For example, when a plurality of mirroring channels are operated, and the channel hopping technique is used, the UWB device may transmit advertisement messages/packets while hopping the plurality of mirroring channels according to the preset hopping configuration. As another example, when a plurality of discovery channels is operated, and the channel hopping technique is used, the UWB device may transmit discovery messages/ packets while hopping the plurality of discovery channels according to the preset hopping configuration.

As such, when a plurality of NB channels is operated, and the channel hopping technique is used, although the corresponding NB channel is simultaneously used by a plurality of devices, inter-signal collision may be prevented, and seamless communication is possible since signals (messages) are transmitted in any channel according to the channel hopping operation. Further, in this case, although the wireless communication environment of any specific channel is poor, seamless communication through another channel with good wireless communication environment is possible since signals (messages) are transmitted while hopping/moving between the plurality of channels.

Transmission Offset for NB Channel

To avoid collisions between messages/frames within slots (ranging slots), a transmission offset may be used. An example of a ranging round to which a transmission offset is applied is shown in FIG. 20.

Figure 20:
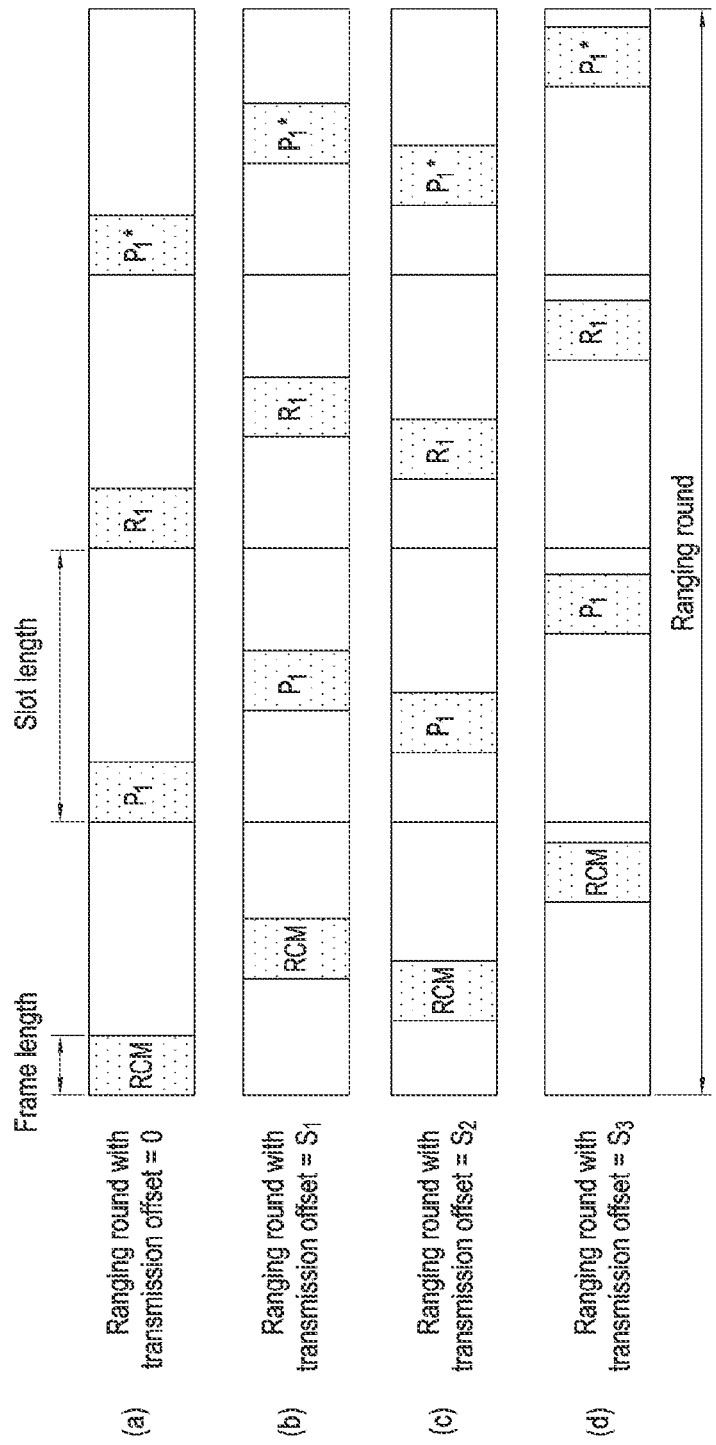
FIG. 20 illustrates a ranging round to which a transmission offset is applied, according to an embodiment.

FIG. 20 illustrates a ranging round to which a transmission offset is applied, according to an embodiment.

With respect to (*a*) of FIG. 20, a ranging round is illustrated in which the transmission offset is 0. With respect to (*b*) of FIG. 20, a ranging round is illustrated in which the transmission offset is $S_1$. With respect to (*c*) of FIG. 20, a ranging round is illustrated in which the transmission offset is $S_2$. With respect to (*d*) of FIG. 20 a ranging round is illustrated in which the transmission offset is $S_3$.

FIG. 20 may be an embodiment to which a transmission offset is applied when exchanging a ranging message in a UWB channel, but without limitations thereto, may also be applied to a message transmission in an NB channel. For a description of the transmission offset, reference may be made to the description of IEEE 802.15.4z.

In FIG. 20, the start time (reference time) of the transmission offset may be the start time of the ranging slot.

The controller may determine the transmission offset and transmit information about the transmission offset to the controlee. For example, the controller may determine the transmission offset for the next ranging round (e.g., the ranging round of the next ranging block) and transmit information about the transmission offset to the controlee through the ranging control message of the current ranging round (e.g., the ranging round of the current ranging block) or another message (e.g., a ranging final message). In this case, the corresponding transmission offset may be applied in the next ranging round.

In the case of transmission of a message/packet within the same ranging round, the same transmission offset may be applied. In other words, the packet in each ranging slot in the corresponding ranging round may be transmitted, with the same transmission offset applied thereto.

Meanwhile, even in the case of message/packet transmission on the NB channel (e.g., discovery channel and/or mirroring channel), the transmission offset needs to be used, as necessary, to avoid collisions between multiple devices. An example of the slot to which the transmission offset is applied upon message transmission on the NB channel may be the same as that shown in FIG. 21.

Figure 21:
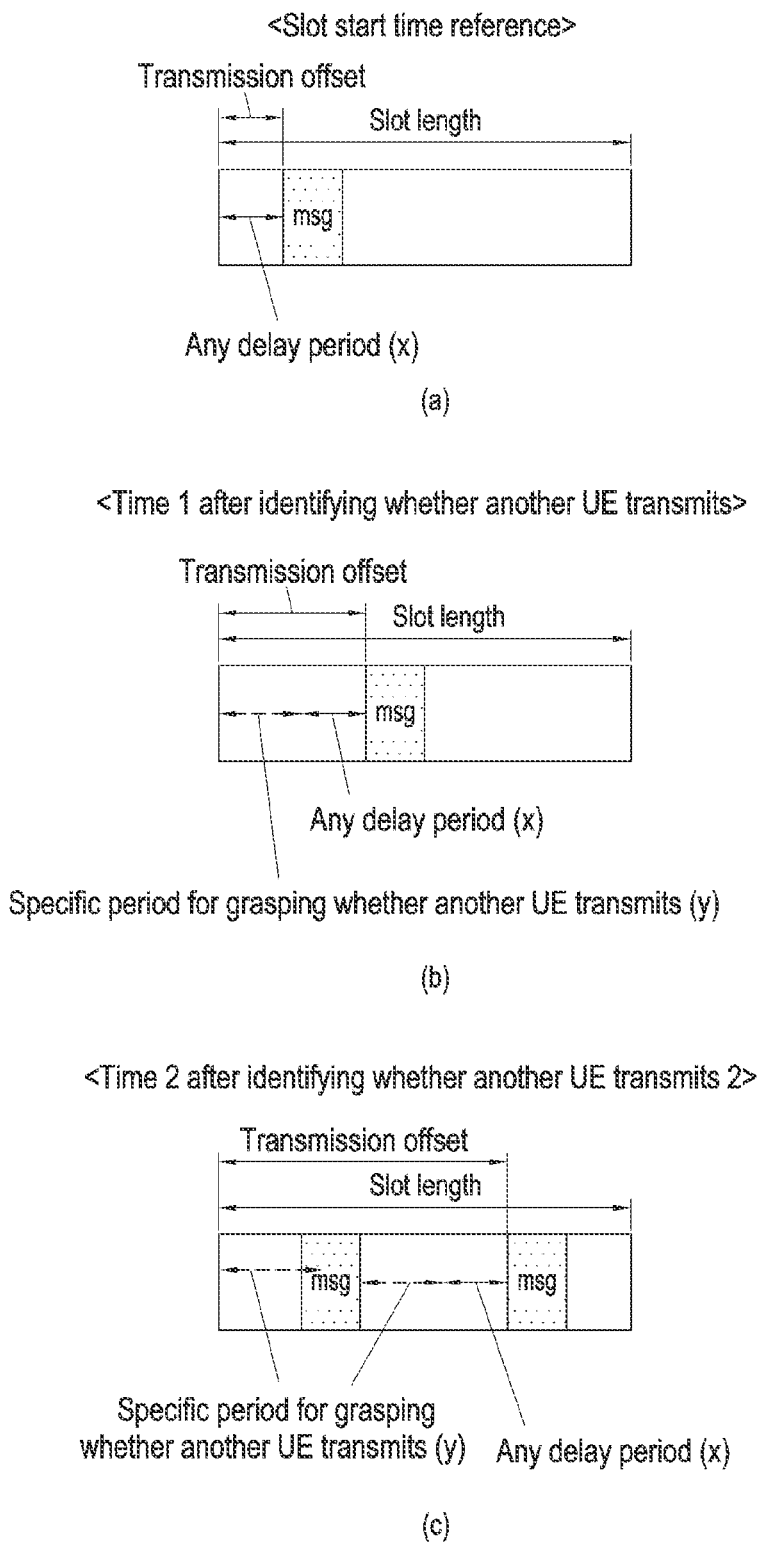
FIG. 21 illustrates a slot when a transmission offset is applied to in an NB channel, according to an embodiment.

FIG. 21 illustrates a slot when a transmission offset is applied to in an NB channel, according to an embodiment.

In an embodiment, the UWB device transmitting a message through the NB channel determines a transmission offset without considering whether another UE (e.g., another UWB device) transmits a message in the corresponding slot of the corresponding NB channel.

With respect to (a) of FIG. 21, a slot is illustrated to which a transmission offset determined according to the embodiment is applied.

Referring to (a) of FIG. 21, the UWB device may determine any delay period x. The UWB device may determine the delay period x based on a specific time arbitrarily selected within a preset time range. The time range used to determine the delay period x may be the same time range preset for the UWB devices transmitting messages through the NB channel.

The UWB device may determine that the delay period x is the transmission offset. As such, in (a) FIG. 21, the start time (reference time) of the delay period x corresponds to the start time of the corresponding slot, so that the delay period x may be determined as the transmission offset.

The UWB device may include and transmit information about the transmission offset (or the delay period x) in a message (e.g., advertisement message and/or discovery message) transmitted in the corresponding slot (e.g., the ranging slot where the delay period x or transmission offset is determined). For example, the UWB device may include the information about the transmission offset (or the delay period x) in the advertisement message transmitted in the corresponding slot through the mirroring channel. As another example, the UWB device may include the information about the transmission offset (or the delay period x) in the discovery message transmitted in the corresponding slot through the discovery channel.

The same transmission offset may be applied in the associated slot(s). For example, the same transmission offset may be applied in the next slot(s) (e.g., the slot(s) where the advertisement message is transmitted subsequent to the current slot) to the current slot (e.g., the slot where the advertisement message including the information about the transmission offset (or the delay time x) is transmitted). For example, the same transmission offset may be applied in the next slot(s) (e.g., the slot(s) where the discovery message is transmitted subsequent to the current slot) to the current slot (e.g., the slot where the discovery message including the information about the transmission offset (or the delay time x) is transmitted).

In another embodiment, the UWB device transmitting a message through the NB channel determines a transmission offset while considering whether another UE (e.g., another UWB device) transmits a message in the corresponding slot of the corresponding NB channel.

With respect to (b) of FIG. 21, a ranging slot is illustrated to which a transmission offset determined according to the embodiment is applied.

Referring to (b) of FIG. 21, the UWB device may identify/grasp whether a message is transmitted from another UWB device during a preset specific period y from the start time of the corresponding slot. The specific period y used to identify/grasp whether a message is transmitted from another UWB device may be the same period preset for the UWB devices transmitting messages through the NB channel.

When no message is transmitted from the other UWB device during the preset specific period y, the UWB device may determine any delay period x. The UWB device may determine the delay period x based on a specific time arbitrarily selected within a preset time range. The time range used to determine the delay period x may be the same time range preset for the UWB devices transmitting messages through the NB channel.

The UWB device may determine that the sum of the preset specific period y and the delay period x is the transmission offset.

The UWB device may include and transmit information about the transmission offset (or the delay period x) in the message transmitted in the corresponding transmission offset in the corresponding slot (e.g., the slot where the delay period x or transmission offset is determined). For example, the UWB device may include the information about the transmission offset (or the delay period x) in the advertisement message transmitted in the corresponding slot through the mirroring channel. As another example, the UWB device may include the information about the transmission offset (or the delay period x) in the discovery message transmitted in the corresponding slot through the discovery channel.

The same transmission offset may be applied in the associated slot(s). For example, the same transmission offset may be applied in the next slot(s) (e.g., the slot(s) where the advertisement message is transmitted subsequent to the current slot) to the current slot (e.g., the slot where the advertisement message including the information about the transmission offset (or the delay time x) is transmitted). For example, the same transmission offset may be applied in the next slot(s) (e.g., the slot(s) where the discovery message is transmitted subsequent to the current slot) to the current slot (e.g., the slot where the discovery message including the information about the transmission offset (or the delay time x) is transmitted).

With respect to (c) of FIG. 21, another example of a ranging slot is illustrated to which a transmission offset determined according to the embodiment is applied.

Referring to (c) FIG. 21, the UWB device may identify/grasp whether a message is transmitted from another UWB device during a preset specific period y from the start time of the corresponding slot. The specific period y used to identify/grasp whether a message is transmitted from another UWB device may be the same period preset for the UWB devices transmitting messages through the NB channel.

When a message is transmitted from another UWB device during the preset specific period y (first period), the UWB device may again identify/grasp whether a message is transmitted from another UWB device during the preset specific period y' (second period) from the time when the transmission of the message has been completed. As shown, the first period y and the second period y' may be the same period, but are not limited thereto. For example, the second period y' may be shorter than the first period y.

When no message is transmitted from the other UWB device during the preset specific period y', the UWB device may determine any delay period x. The UWB device may determine the delay period x based on a specific time arbitrarily selected within a preset time range. The time range used to determine the delay period x may be the same time range preset for the UWB devices transmitting messages through the NB channel.

The UWB device may determine the transmission offset based on any delay period x and/or transmission-related time information (e.g., transmission start time, transmission end time, and/or transmission period) of the UWB message transmitted from another UWB device(s), the preset specific period y (first period), and preset specific period y' (second period). For example, the UWB device may determine that the sum of the preset specific period y (first period), the period from the preset specific period y to the transmission end time of the message transmitted from another UWB device(s), the preset specific period y' (second period), and any delay period x is the transmission offset. As another example, the UWB device may determine that the sum of the period from the start time of the corresponding slot to the transmission start time of the UWB message transmitted from another UWB device(s), the transmission period of the UWB message transmitted from another UWB device(s), the preset specific period y' (second period), and any delay period x is the transmission offset.

The UWB device may include and transmit information about the transmission offset (or the delay period x) in the message transmitted in the corresponding transmission offset in the corresponding slot (e.g., the slot where the delay period x or transmission offset is determined). For example, the UWB device may include the information about the transmission offset (or the delay period x) in the advertisement message transmitted in the corresponding slot through the mirroring channel. As another example, the UWB device may include the information about the transmission offset (or the delay period x) in the discovery message transmitted in the corresponding slot through the discovery channel.

The same transmission offset may be applied in the associated slot(s). For example, the same transmission offset may be applied in the next slot(s) (e.g., the slot(s) where the advertisement message is transmitted subsequent to the current slot) to the current slot (e.g., the slot where the advertisement message including the information about the transmission offset (or the delay time x) is transmitted). For example, the same transmission offset may be applied in the next slot(s) (e.g., the slot(s) where the discovery message is transmitted subsequent to the current slot) to the current slot (e.g., the slot where the discovery message including the information about the transmission offset (or the delay time x) is transmitted).

Round Hopping for NB Channel

The UWB devices participating in ranging message exchange (ranging exchange) on the UWB channel may use a ranging round different from, but not identical to, the ranging round of the current ranging block in the next ranging block. For example, since the transmission time is changed in the ranging block if round hopping is used, the ranging round of the next ranging block may differ from the ranging round of the current ranging block. Here, the same ranging round may mean that the index of the ranging round of the current ranging block is the same as the index of the ranging round of the next ranging block, and different ranging rounds may mean that the index of the ranging round of the current ranging block differs from the index of the ranging round of the next ranging block.

Figure 22:
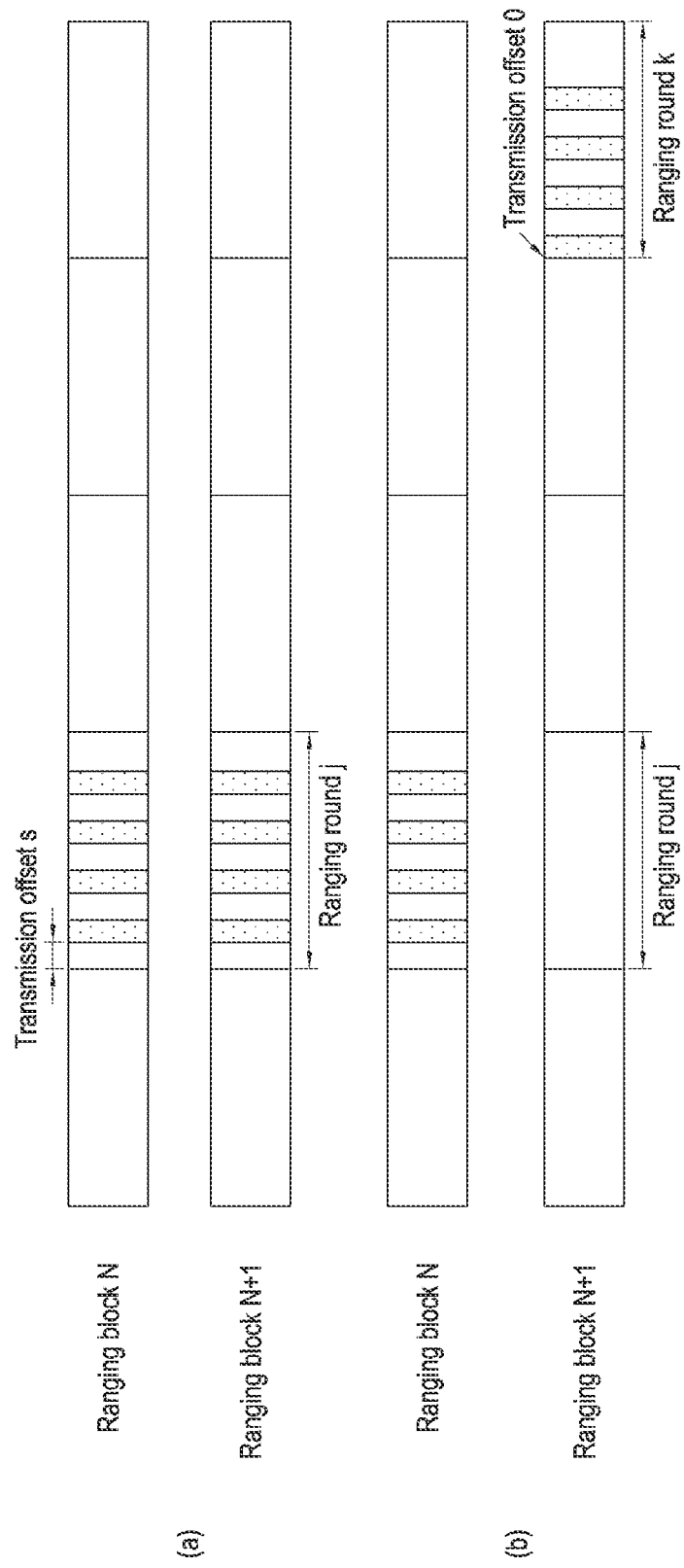
FIG. 22 illustrates an example of round hopping, according to an embodiment.

FIG. 22 illustrates an example of round hopping, according to an embodiment.

With respect to (a) of FIG. 22 an embodiment is illustrated in which round hopping does not apply. With respect to (b) of FIG. 22, an embodiment is illustrated in which round hopping applies.

The controller may determine whether to hop to a different ranging round in the next ranging block. For example, the controller may determine whether to apply round hopping.

When round hopping is not applied/triggered, the UWB device may use the same ranging round in the next ranging block. For example, as shown in (a) of FIG. 22, when round hopping is not applied, the UWB device may use the same ranging round j as the ranging round j of the current ranging block N in the next ranging block N+1.

When round hopping is applied/triggered, the UWB device may use a different ranging round in the next ranging block. The UWB device may hop to a different ranging round in the next ranging block using the hopping sequence generated based on information pre-exchanged to generate a hopping sequence or a pre-negotiated hopping sequence. For example, as shown in (b) of FIG. 22, when round hopping is applied, the UWB device may use a ranging round k different from the ranging round j of the current ranging block N in the next ranging block N+1.

When the ranging round used by the UWB device on the UWB channel is changed, the time of transmission of the message transmitted on the mirroring channel synchronized/coupled with the UWB channel needs to be changed as well. An example of changing the transmission time of the mirroring channel (NB channel) according to a change in the transmission time of the UWB channel may be shown in FIG. 23.

Figure 23:
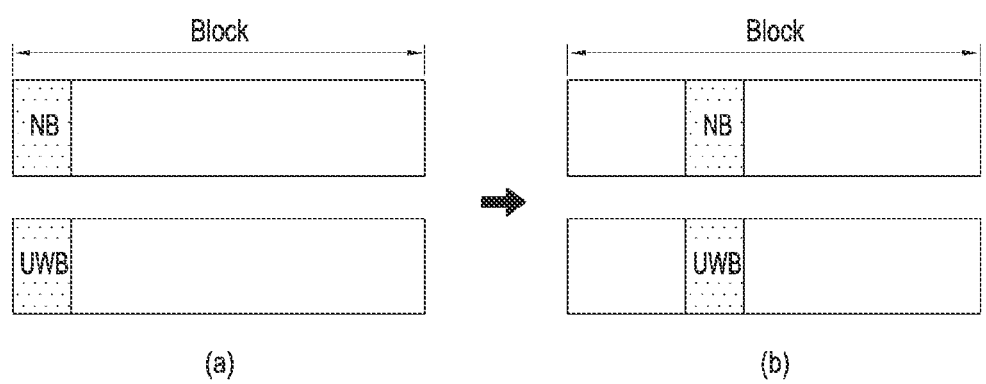
FIG. 23 illustrates an example of synchronization between a UWB channel and an NB channel, according to an embodiment.

FIG. 23 illustrates an example of synchronization between a UWB channel and an NB channel, according to an embodiment.

With respect to (a) of FIG. 23, synchronization is illustrated between the UWB channel and the mirroring channel (NB channel) in the current ranging block. With respect to (b) of FIG. 23, synchronization is illustrated between the UWB channel and the mirroring channel (NB channel) in the next ranging block when the transmission time of the UWB channel is changed (i.e., a change of the ranging round used in the UWB channel). A change in the transmission time of the UWB channel may come from application of round hopping as shown in FIG. 22, but is not limited thereto.

Referring to (a) of FIG. 23, in the current ranging block, the UWB device may transmit a UWB message in the ranging round j of the UWB channel and transmit an advertisement message through the mirroring channel at the time synchronized with the transmission time of the UWB channel (or transmission time of UWB message). The transmission time of the message through the mirroring channel may be determined based on the transmission time of the UWB channel.

When the transmission time of the UWB channel is changed, the UWB device may include information about the change in the transmission time in the message and transmit the message through the NB channel. For example, when round hopping is applied, the UWB device may include information about the round hopping (e.g., the index of the ranging round to be hopped in the next ranging block) in the advertisement message and transmit it through the mirroring channel. In this case, a peripheral device with no UWB connection set may identify a change in the transmission time of the UWB channel through the corresponding information and participate in ranging exchange in the corresponding ranging round.

Referring to (b) of FIG. 23, in the next ranging block, the UWB device may transmit a UWB message in the ranging round k different from the ranging round j of the previous ranging block of the UWB channel and transmit an advertisement message at the changed time through the mirroring channel synchronized with the transmission time of the UWB channel (or transmission time of UWB message). The transmission time of the message through the mirroring channel may be determined based on the transmission time of the UWB channel.

In the above-described embodiments, the components included in the disclosure are represented in singular or plural forms depending on specific embodiments disclosed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although embodiments of the disclosure have been described above, various changes may be made thereto without departing from the scope of the disclosure. Thus, the scope of the disclosure should not be limited to the above-described embodiments, and should rather be defined by the following claims and equivalents thereof.

What is claimed is:

1. A method for ultra-wideband (UWB) communication, the method comprising:
   transmitting, by a first UWB device, an advertisement message through a narrowband (NB) channel;
   receiving, by the first UWB device, a first message for connection setup through the NB channel, from a second UWB device; and
   transmitting, by the first UWB device, a second message responding to the first message through the NB channel, to the second UWB device,
   wherein the second message includes information for communication on a UWB channel, and
   wherein the UWB channel is one of a plurality of candidate UWB channels for the UWB communication.

2. The method of claim 1, wherein the NB channel is a public channel or a private channel set through negotiation with the second UWB device.

3. The method of claim 1, wherein:
   the advertisement message is periodically broadcast by the first UWB device, and
   wherein information about a transmission period of the advertisement message is included in the advertisement message.

4. The method of claim 1,
   wherein a bandwidth of the NB channel is different from a bandwidth of the UWB channel.

5. The method of claim 1,
   wherein the information for communication on the UWB channel comprises information about the UWB channel.

6. A method for ultra-wideband (UWB) communication, the method comprising:
   receiving, from a first UWB device, an advertisement message, at a second UWB device, through a narrowband (NB) channel;
   transmitting, by the second UWB device, a first message for connection setup through the NB channel, to the first UWB device; and
   receiving, from the first UWB device, a second message responding to the first message, at the second UWB device, through the NB channel,
   wherein the second message includes information for communication on a UWB channel, and
   wherein the UWB channel is one of a plurality of candidate UWB channels for the UWB communication.

7. The method of claim 6, wherein the NB channel is a public channel or a private channel set through negotiation with the second UWB device.

8. The method of claim 6, wherein:
   the advertisement message is periodically broadcast by the first UWB device, and
   wherein information about a transmission period of the advertisement message is included in the advertisement message.

9. The method of claim 6,
   wherein a bandwidth of the NB channel is different from a bandwidth of the UWB channel.

10. The method of claim 6,
    wherein the information for communication on the UWB channel comprises information about the UWB channel.

11. A first ultra-wideband (UWB) device, comprising:
    at least one transceiver; and
    a controller connected to the at least one transceiver, wherein the controller is configured to:
    transmit an advertisement message through a narrowband (NB) channel,
    receive a first message for connection setup through the NB channel, from a second UWB device, and
    transmit a second message responding to the first message through the NB channel, to the second UWB device,
    wherein the second message includes information for communication on a UWB channel, and
    wherein the UWB channel is one of a plurality of candidate UWB channels for UWB communication.

12. The first UWB device of claim 11,
    wherein a bandwidth of the NB channel is different from a bandwidth of the UWB channel.

13. The first UWB device of claim 11,
    wherein the information for communication on the UWB channel comprises information about the UWB channel.

14. A second ultra-wideband (UWB) device comprising:
    at least one transceiver; and
    a controller connected to the at least one transceiver, wherein the controller is configured to:
    receive, from a first UWB device, an advertisement message through a narrow band (NB) channel,
    transmit a first message for connection setup through the NB channel, to the first UWB device, and receive, from the first UWB device, a second message responding to the first message through the NB channel, wherein the second message includes information for communication on a UWB channel, and wherein the UWB channel is one of a plurality of candidate UWB channels for UWB communication.

15. The second UWB device of claim 14, wherein a bandwidth of the NB channel is different from a bandwidth of the UWB channel.

16. The second UWB device of claim 14, wherein the information for communication on the UWB channel comprises information about the UWB channel.

* * * * *